US010038658B2

(12) United States Patent
Barrera et al.

(10) Patent No.: US 10,038,658 B2
(45) **Date of Patent: *Jul. 31, 2018**

(54) COMMUNICATION STREAMS

(71) Applicant: ROFORI CORPORATION, Manassas, VA (US)

(72) Inventors: Elvis A. Barrera, Warrenton, VA (US); Will C. Dantzler, Manassas, VA (US); David J. Leigh, Warrenton, VA (US)

(73) Assignee: ROFORI CORPORATION, Manassas, VA (US)

( * ) Notice: Subject to any disclaimer, the term of this patent is extended or adjusted under 35 U.S.C. 154(b) by 340 days.

This patent is subject to a terminal disclaimer.

(21) Appl. No.: 14/828,240

(22) Filed: Aug. 17, 2015

(65) Prior Publication Data

US 2015/0358267 A1 Dec. 10, 2015

Related U.S. Application Data

(63) Continuation of application No. 14/567,763, filed on Dec. 11, 2014, now Pat. No. 9,172,672, which is a continuation of application No. 14/329,665, filed on Jul. 11, 2014, now Pat. No. 8,938,514.

(60) Provisional application No. 61/845,019, filed on Jul. 11, 2013.

(51) Int. Cl.
*H04L 12/58* (2006.01)
*G06Q 10/10* (2012.01)

(52) U.S. Cl.
CPC ........... *H04L 51/12* (2013.01); *G06Q 10/107* (2013.01); *H04L 51/04* (2013.01); *H04L 51/16* (2013.01); *H04L 51/36* (2013.01); *H04L 51/32* (2013.01)

(58) Field of Classification Search
CPC .............. H04M 3/5335; G06Q 10/107; H04N 7/17309
USPC .......................................................... 709/206
See application file for complete search history.

(56) References Cited

U.S. PATENT DOCUMENTS

| | | | | |
|---|---|---|---|---|
| 5,283,856 | A | 2/1994 | Gross et al. | |
| 7,613,180 | B2 | 11/2009 | Tanaike et al. | |
| 8,218,549 | B2 | 7/2012 | Dekel et al. | |
| 2003/0065727 | A1 | 4/2003 | Clarke et al. | |
| 2006/0148551 | A1 * | 7/2006 | Walker | G07F 17/32 463/16 |
| 2007/0015508 | A1 * | 1/2007 | Gross | H04W 52/06 455/436 |
| 2008/0153459 | A1 * | 6/2008 | Kansal | H04M 1/72547 455/412.1 |

(Continued)

FOREIGN PATENT DOCUMENTS

| | | |
|---|---|---|
| WO | WO 02/096105 | 11/2002 |

OTHER PUBLICATIONS

International Search Report and Written Opinion, dated Oct. 27, 2014, in PCT/US14/46363.

*Primary Examiner* — Arvin Eskandarnia
(74) *Attorney, Agent, or Firm* — Cahn & Samuels, LLP

(57) ABSTRACT

Embodiments described herein organize and percolate important messaging and information to the top of a communications pile, and create a high ratio of front-and-center communication versus chatter communication. This is analogous to creating a high signal-to-noise ratio in signal communications. Thus, embodiments described herein raise the desired signal level high above the noise level to obtain a visual at-a-glance level of communication with reduced clutter or no clutter.

20 Claims, 31 Drawing Sheets

(56) References Cited

U.S. PATENT DOCUMENTS

| | | | | |
|---|---|---|---|---|
| 2010/0214998 | A1 | 8/2010 | Hirano et al. | |
| 2010/0332618 | A1 | 12/2010 | Norton et al. | |
| 2013/0041968 | A1 | 2/2013 | Cohen et al. | |
| 2013/0079120 | A1 * | 3/2013 | Walker .................... | G07F 17/32 463/25 |

* cited by examiner

| 492 | TYPE COMPLEMENT |
| 490 | INTERNAL LINKS |
| 488 | STREAM INFO |
| 486 | CATEGORIES |
| 484 | EXTERNAL INFO |
| 482 | OPTIONS INFO |
| 480 | MESSAGE TYPE |
| 478 | MODE |
| 476 | MEMBER NAME |
| 474 | CONTENT |
| 472 | DATE & TIME |
| 470 | LOCATION |

Email Integration

Message Type Relationships

800

Rule Title:
Initiating Message Type:
Closing Message Type:

Relationship Rules Settings - (CTS)

Rules drive:
- Status (drive towards accomplishment)
- Filters
- Metrics

Add

| Rule | Init Message Type | Close Message Type | Order | | Action |
|---|---|---|---|---|---|
| Issues (not resolved) | Issue | No Resolution | Move Up | Edit | Delete |
| Tasks NOT complete | Task Assigned | No Task Completed | Move Up | Edit | Delete |
| Questions (not answered) | Question | No Answer | Move Up | Edit | Delete |
| Resource Need (not resolved) | Resource Need | No Resource Resolved | Move Up | Edit | Delete |
| Meetings NOT ENDED | Meeting Started | No Meeting Ended | Move Up | Edit | Delete |
| Deliverables | Deliverable | | Move Up | Edit | Delete |

1 2

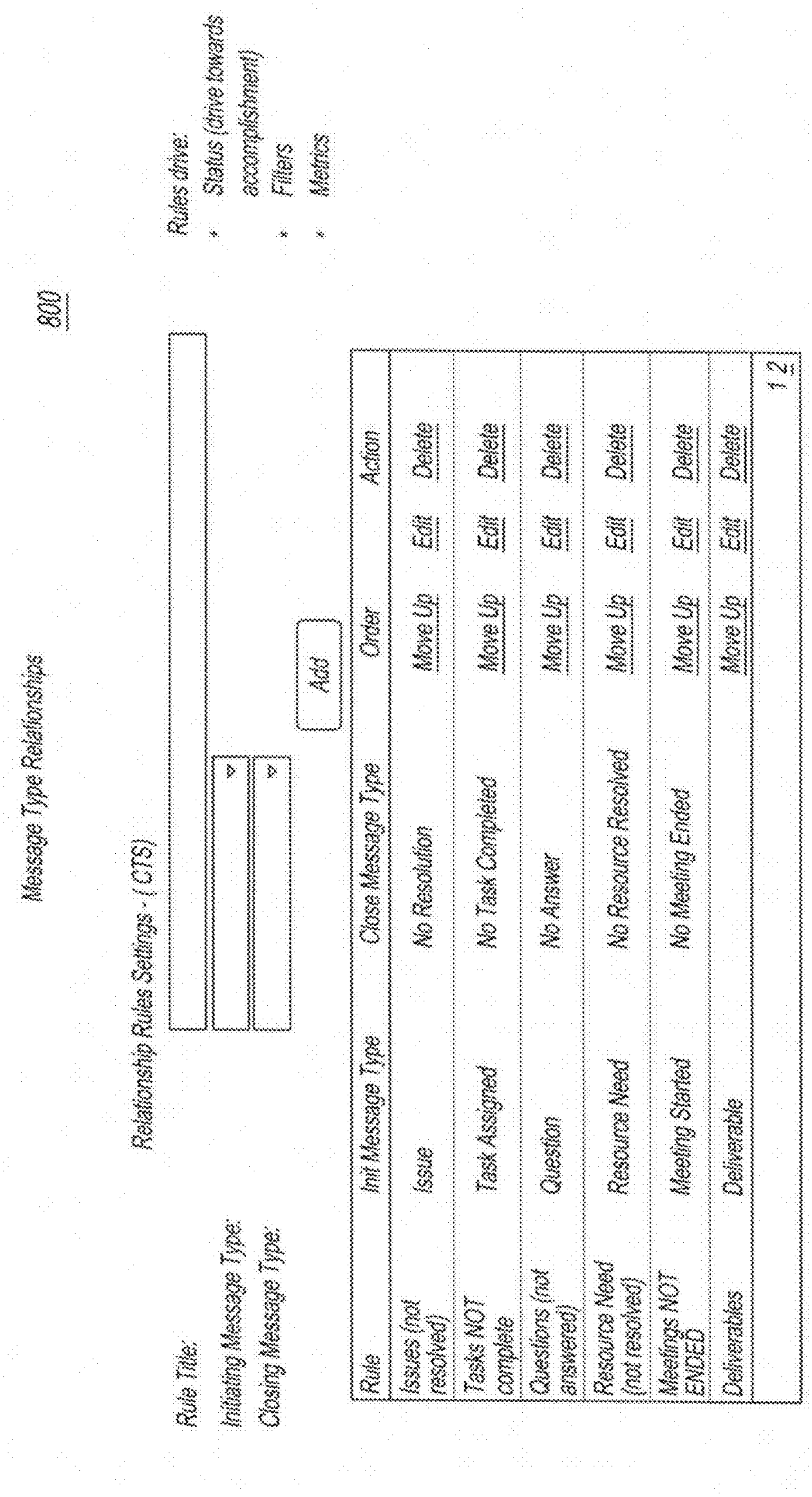

FIG. 8

Category Fields

Manage Template Fields - (CTS)

Message Type: [Message ▼]     ☐ Enable Discussions - (Disabled)

| Text | Row | Column | Span | Defaults | Enhanced Mode | Required | Action |
|------|-----|--------|------|----------|---------------|----------|--------|
| Start | 1 | 1 | 0 | Current Date/Time | Yes | Yes | Edit |
| End | 1 | 2 | 0 | | No | Yes | Edit |
| State | 2 | 1 | 0 | Displays Quick Pick | Yes | Yes | Edit |
| Work Item | 3 | 1 | 2 | | | Yes | Edit |

[Back]     Video Tutorial     [Preview]     [Continue]

900

The items listed above are the current category data fields that are part of the message entry form for this stream. Fields are an important way of turning messages into meaningful information. Category data is used for collecting categorization and other data that enhances message context and searches. You specify where you want the fields located within the designated area on the Message entry form, as shown in the Category Data layout example by changing the Row, Column, and Column Span values for each field.

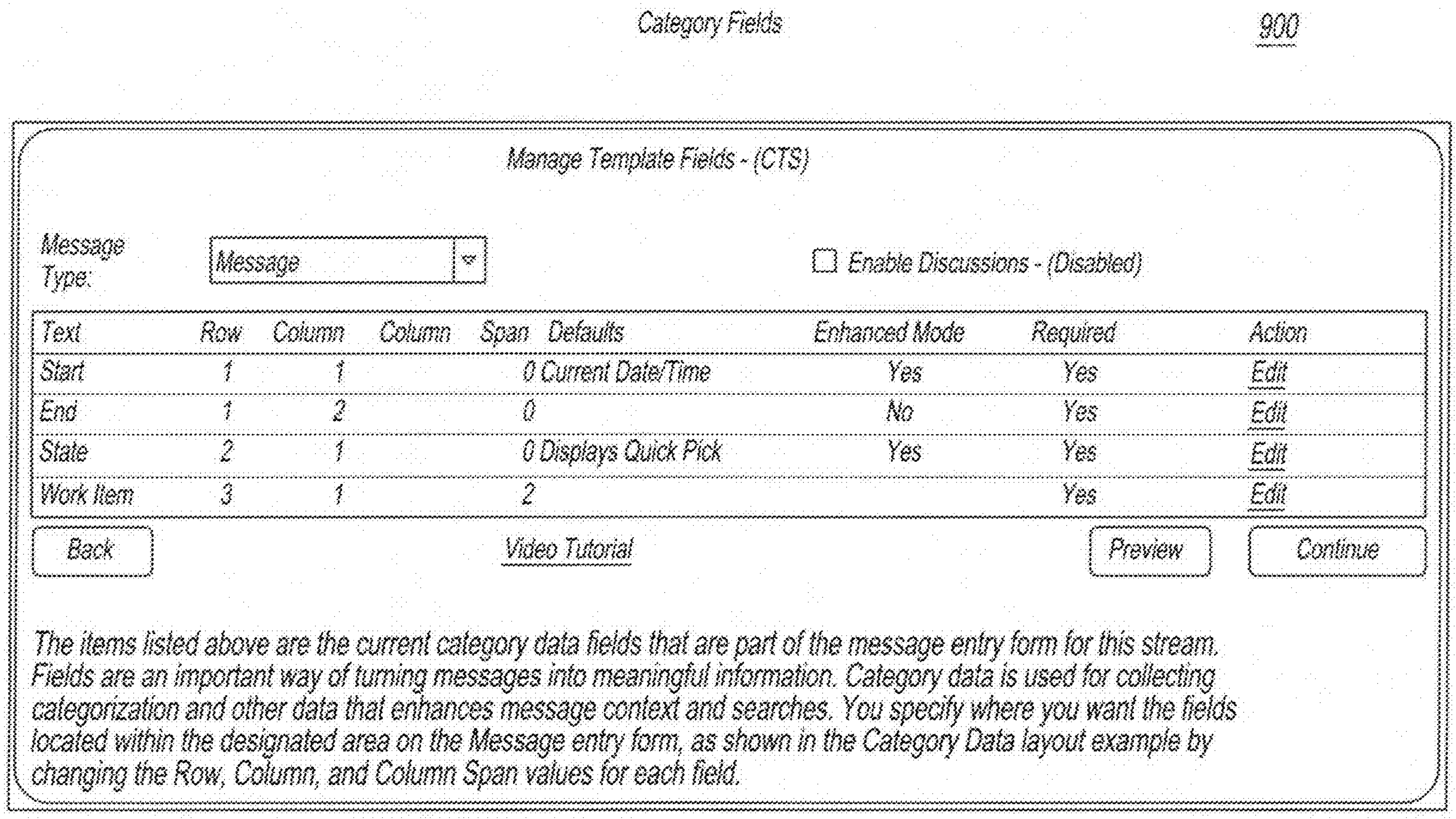

FIG. 9

Stream Message Template – (NEW STREAM)

New Template Setup
- Basic (Select if you do not want any category data fields)
- Extended (Select to have all category data fields, then change or remove them)
- Custom (Advanced – Select the number and type of category data fields)
- Existing Custom (Select from one of you existing templates)

} Starting configurations for your template

Edit Template Details
Name:
Description:

The Stream Template defines the Message Types and category data fields that you want your messages in this stream to have, which enables Rofori to help you accomplish your objective. You must select either one of the built-in stream templates or one of the templates that you have previously created. The selected template will be used as the starting point for this stream's set-up.

Enter a template Name and Description for this stream's template, then click "Continue" to proceed.

[Continue]

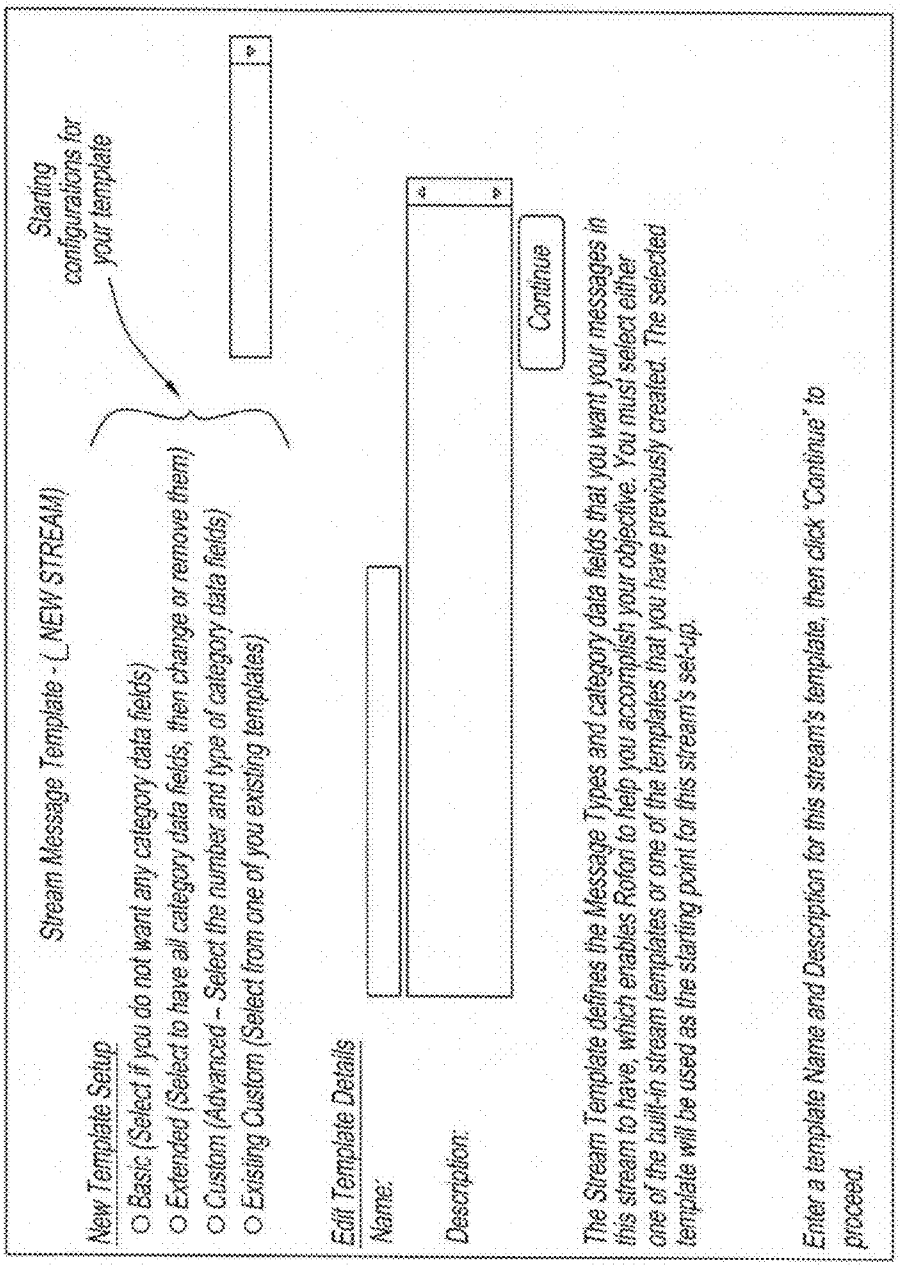

*FIG. 12A*

Choose Template Fields - (NEW STREAM)

Date/Time: | 0 - No fields on form ▼
State: | 0 - No fields on form ▼
List: | 0 - No fields on form ▼

0 - No fields on form
1 - No fields on form

Date/Time – display up to State – display one field List – display one field

In a subsequent Manage in a layout you prefer, Yo play on your message input form. You have the option to fields, with limits by the type of field as follows:

update wizard, you will have the option to arrange these fields unwanted fields.

Back    Continue

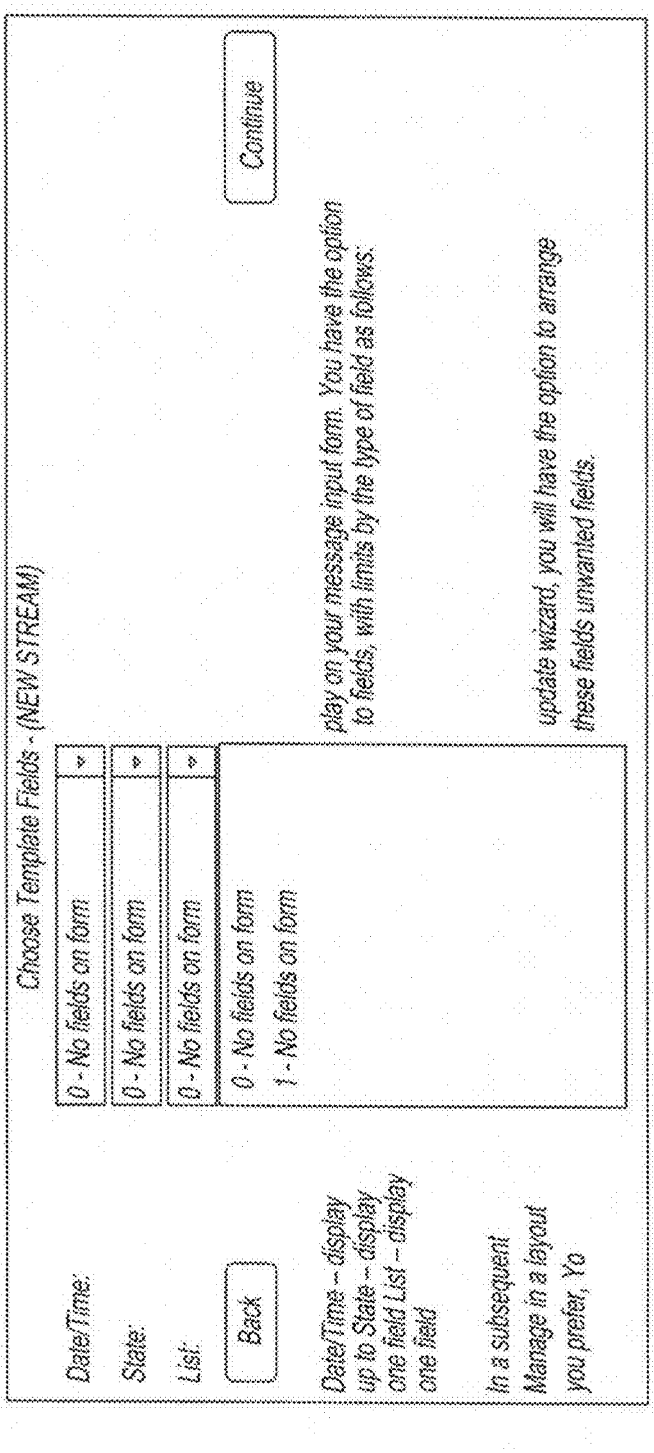

FIG. 12D

Manage Template Fields
The optional category fields may be used to relate messages to other aspects of the stream's activity, such as project management, timesheet, or other tracking system identification codes or activity categories, due dates, occurrence dates, etc.

Manage Template     Click to Add more Category Fields

Add a new template field by clicking the add button.

☐ Enable Discussions -- (Disabled)

| Text | Row | Column | Column Span | Defaults | Enhanced Mode | Required | Action |
|------|-----|--------|-------------|----------|---------------|----------|--------|
| Activity | 3 | 1 | 2 | | | No | Edit Delete |

[Back]    [Add]

[Preview]    [Continue]

*If a field is not used, you may delete it*

*View the message input form resulting from your changes*

*Check to Enable Discussion Categories*

The items listed above are the current category data fields that are part of the message entry form... this stream. Fields are an important way of turning messages into meaningful information. Category data is un... collecting categorization and other data that enhances message context and searches. You specify where yo... the fields. ....cated within the designated area on the Message entry form, as shown in the Category Data layout... by changing the Row, Column, and Column Span values for each field.

Change the "Enable Discussions" free text category field to Enabled or Disabled... its selection box.

You may delete fields from the Template only when no messages in the stream

You may change a field by clicking the "Edit" link in the Action column for a field. To save your... click "Update". To discard your changes without saving, click "Cancel".

Some items have "Enhanced Mode" features that may be enabled -- when enabled a description of the features will be displayed in the "Defaults" column. The following enhanced modes are available:

Date field -- automatically fill with current Date value.

State field -- Enable the User's Quick Pick values from their Preferences

You may preview what the Message Entry form will look like resulting from your current Template changes by clicking the "Preview" button to open it in a pop-up window.

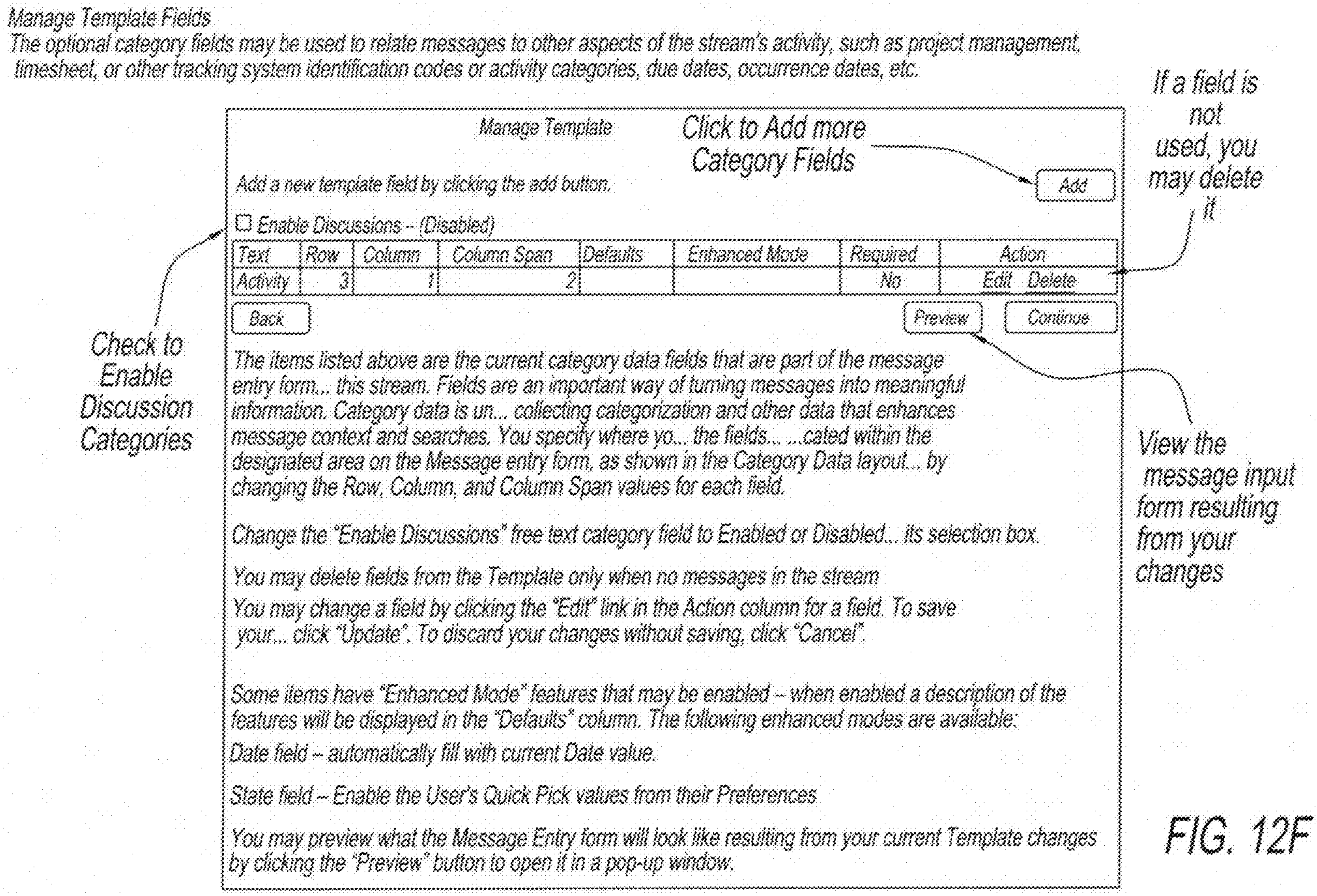

FIG. 12F

The message entry form can display up to five (5) categorization data fields, as depicted below:

Instant status reports and derived metrics

SMART STATUS REPORT - GSS

DETAIL REPORT
FROM: 11/9/2012 to: 12/19/2012
Printed: 12/19/2012 8:11 AM

Issues (resolved)
Work Item: PS14

Jorge — I working with Steve and Karen on the sharepoint server. It seems is down at the moment. Sharepoint server is back online. DB-03 just needed a reboot, I confirmed that the password was change and the services were updated.    Issue Resolution Automatically Categorized →

Issues (not resolved)
Work Item: PS14

Jorge — DC-HV-03 has run out of space in the C drive. That's the reason why MS-01 was pause. I'm currently looking into it.    Issue David — Primary GSS SQL Server DC-DB-A-3 is running very slow. I am investigating.    Issue

Questions (answered)
Work Item: PS14

Jorge — David, Steve asked earlier if we know of a tool that can replicate the hard disk image of a configured 2008 R2 server that then he can setup on other servers that have the same specification in hardware. I know that we used SysPrep but we used it for windows 2003 server and on VMs. Let me know if you have any insights in such a tool.    Question David — Use System Center Configuration Manager for the servers the same as is being done for the Windows 7 Workstations and Notebooks.    Answer

Questions (not answered)
Work Item: PS14

Jorge — I'm ready to start patching the GSS servers below. Since most of the servers will need to be rebooted I need Steve or Mike or Karen to reboot them at night since I cannot do it during working hours. My plan is to do as many servers during the daytime. I will be posting what servers I have completed as I did with the CTS servers. Please let me know if you have any concerns or questions.    Question Automatic metrics →

Message Metrics - (Last 30 Days)

| Message Type Rule | Total # | # No Response | # Closed | % Closed | % No Response | Avg No Response (Days) | Avg Time to Respond (Hours) | Avg Days Open Top 3 Initiators |
|---|---|---|---|---|---|---|---|---|
| Lead (Closed) | 2 | 1 | 0 | 0 | 50 | 21.9 | 0.3 | 0 |
| Question (with Answer) | 7 | 6 | 1 | 14 | 86 | 12.9 | 0 | 0.8 |
| Task (complete) | 9 | 1 | 6 | 67 | 11 | 0.1 | 227.5 | 3 |

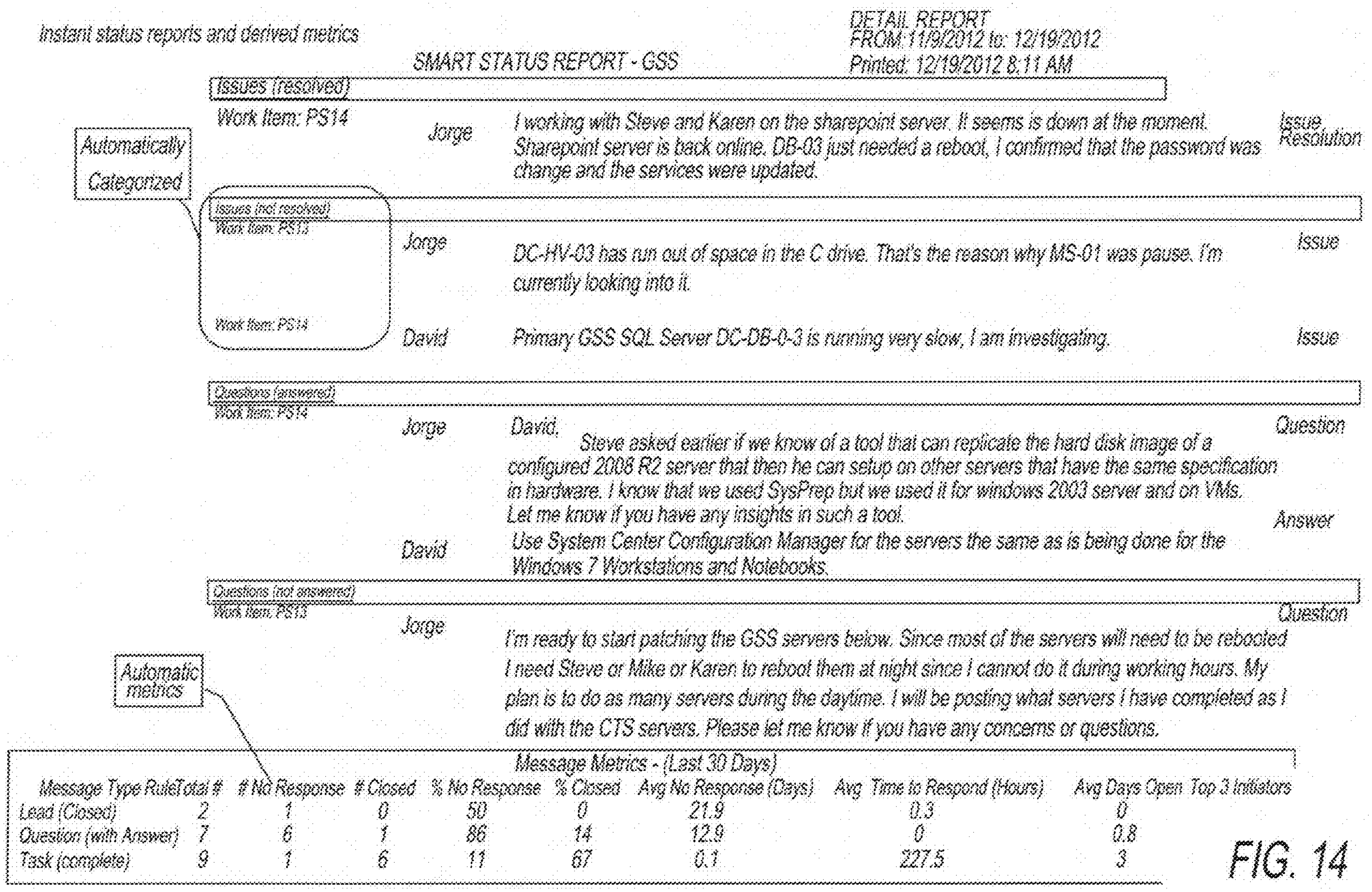

FIG. 14

COMMUNICATION STREAMS

CROSS-REFERENCE TO RELATED APPLICATIONS

This application is a continuation application of U.S. application Ser. No. 14/567,763 filed Dec. 11, 2014, which is a continuation of U.S. application Ser. No. 14/329,665, filed Jul. 11, 2014, which claims priority to U.S. Provisional Application No. 61/845,019, filed on Jul. 11, 2013, the entire contents of each are incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Several forms of electronic communications are available, such as e-mail, personal and professional social networks, blogs, instant messaging, texting and chatting. However, there is little to no organization within each of these types of electronic communications. As a result, this lack of organization leads many people to utilize several of these sources to meet their various needs.

Many organizations or businesses also utilize some form of business records or artifacts, such as status reports, activity logs, and time reports to keep current with operations. These reports can be very time consuming to compile, since information is gathered from multiple unrelated sources. This lack of organization within various sources causes an overload of unrelated and unorganized communication and information.

SUMMARY

Embodiments described herein organize and percolate important messaging and information to the top of a communications pile, and create a high ratio of front-and-center communication versus chatter communication. This is analogous to creating a high signal-to-noise ratio in signal communications. Thus, embodiments described herein raise the desired signal level high above the noise level to obtain a visual at-a-glance level of communication with reduced clutter or no clutter.

Embodiments described herein also consolidate communications, wherein many products, such as reports can be derived from an original body or pool of communications. Accordingly, communications from one source, such as email, can be fully integrated with other sources of communications. This creates an effective and efficient "one-stop shop" of communication in a centralized and easily organized manner.

Embodiments described herein provide a visual accuracy and timely situational awareness using activity-focused communication streams. A communication stream, as described herein may be a private message stream for a defined group, created by a team leader or owner. Entities are invited to join the private stream as stream members. Entities can be individuals, organizations, companies, associations, committees, sensors, other machine systems, and the like. The stream is usually centered around an objective (project or activity), theme, or goal. Individual stream members may post activity status messages, which are tagged with an individual tag or icon that is representative of the messages' content. Examples include, but are not limited to a status, information, issue, resolution, deliverable, question, answer, concern, feedback, comment, task assigned, task completed, meeting started, or meeting ended type of message.

The displayed icon allows stream members to immediately determine the importance and the kind of activity that is occurring by a visual identification at-a-glance, without reading or interpreting the message. The stream owner can configure message types and category data values, along with relationship rules, such as an issue/resolution, a question/answer, a task assignment/completion, topical discussions, automatic knowledge creation, instant status reporting, milestones, and deliverables. As an example, when a task is assigned, messages are threaded to the task activity. An intelligent search engine mixes and matches combinations of category field values with message words or phrases.

A communication stream can be used in status reporting. A combination of micro-blogs from stream members and filtering by selected parameters provide a comprehensive status report with no additional work or input from outside sources. The communication stream can also be tied to other devices, such as a smart device, to provide alerts and notification of events, milestones, status, inactivity, and excess activity, for example.

Embodiments described herein enable real time social networking, collaboration, publishing, and feedback relating to different customers or members from a local and/or geographically dispersed team. Real time data collection is also enabled, including but not limited to billable hours, activity notes, milestone accomplishments, issues, and problem resolution information from individual members in a manner that is integral with their normal daily work activity.

Described herein is a computer-implemented method that includes generating, at one or more servers, a communication stream having one or more stream members and receiving, at the one or more servers, a plurality of stream messages from the one or more stream members, the plurality of stream messages each including a message content and a message type. The method further includes adding, at the one or more servers, the stream messages to the communication stream to be accessible by the one or more stream members, and analyzing, at the one or more servers, the message type of each of the stream messages and forming correlations there-between, the correlations being a function of complementary message rules. The method also includes serving, from the one or more servers to a client device, communication stream status updates to the client device, the communication stream status updates being based in part on message types of the plurality of stream messages and an analysis of correlations formed between the plurality of stream messages.

The message type indicates status events relating to an objective of the communication stream.

The message type includes at least one of status, feedback, question, answer, issue and resolution.

The amount of available message types cannot exceed a predetermined value.

The method further comprises analyzing, at the one or more servers and in response to receiving a response message to a stream message, the message type of the stream message and the message type of the response message to form a correlation there-between, the correlation being a function of the complementary message rules.

The method further comprises filtering, at the one or more servers, the messages based on the message types.

The method further comprises filtering, at the one or more servers, the stream messages based on the message types and correlations formed between the stream messages.

The communication stream further includes category indicators identifying various aspects of activities relating to an objective of the communication stream.

Each stream message further includes a category indicator.

The method further comprises filtering, at the one or more servers, the stream messages based on the category indicator and the message type.

The communication stream status updates include metrics relating to stream messages having correlations satisfying the complementary message rules.

The method further comprises serving, from the one or more servers to the client device, a user interface having a first section containing a plurality of stream messages each containing a visual indicator corresponding to the message type of the particular stream message, and a second section containing details of a select stream message.

Described herein is a computer-implemented method for providing a communication stream on a client device, the method comprising: transmitting, from the client device to at least one server, a command for the at least one server to generate a communication stream having one or more stream members, a user of the client device being one member of the communication stream; transmitting, from the client device to the at least one server, a plurality of stream messages, the plurality of stream messages each including a message content and a message type; receiving, at the client device from the at least one server, the communication stream accessible by the one or more stream members and having the stream messages, the communication stream further having correlations formed between the message types of the stream messages, the correlations being a function of complementary message rules; and receiving, at the client device and from the at least one server, communication stream status updates to a client device, the communication stream status updates being based in part on message types of the stream messages and an analysis of correlations formed between the stream messages.

The message type indicates status events relating to an objective of the communication stream.

The amount of available message types cannot exceed a predetermined value.

The method further comprises: receiving, at the client device and from the at least one server, messages filtered based on the message types and correlations formed between the stream messages.

The communication stream further includes category indicators identifying various aspects of activities relating to an objective of the communication stream.

Each stream message further includes a category indicator.

The method further comprises: receiving, at the client device from the at least one server, messages filtered based on the category indicator and the message type.

The communication stream status updates include metrics relating to stream messages having correlations satisfying the complementary message rules.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a screen shot of message type relationships, according to an embodiment;

FIG. 9 is a screen shot of category fields, according to an embodiment;

FIGS. 12A-12G are screen shots of a template wizard, according to an embodiment;

FIG. 14 illustrates a status report, according to an embodiment;

DETAILED DESCRIPTION OF THE EMBODIMENTS

Figure 1:
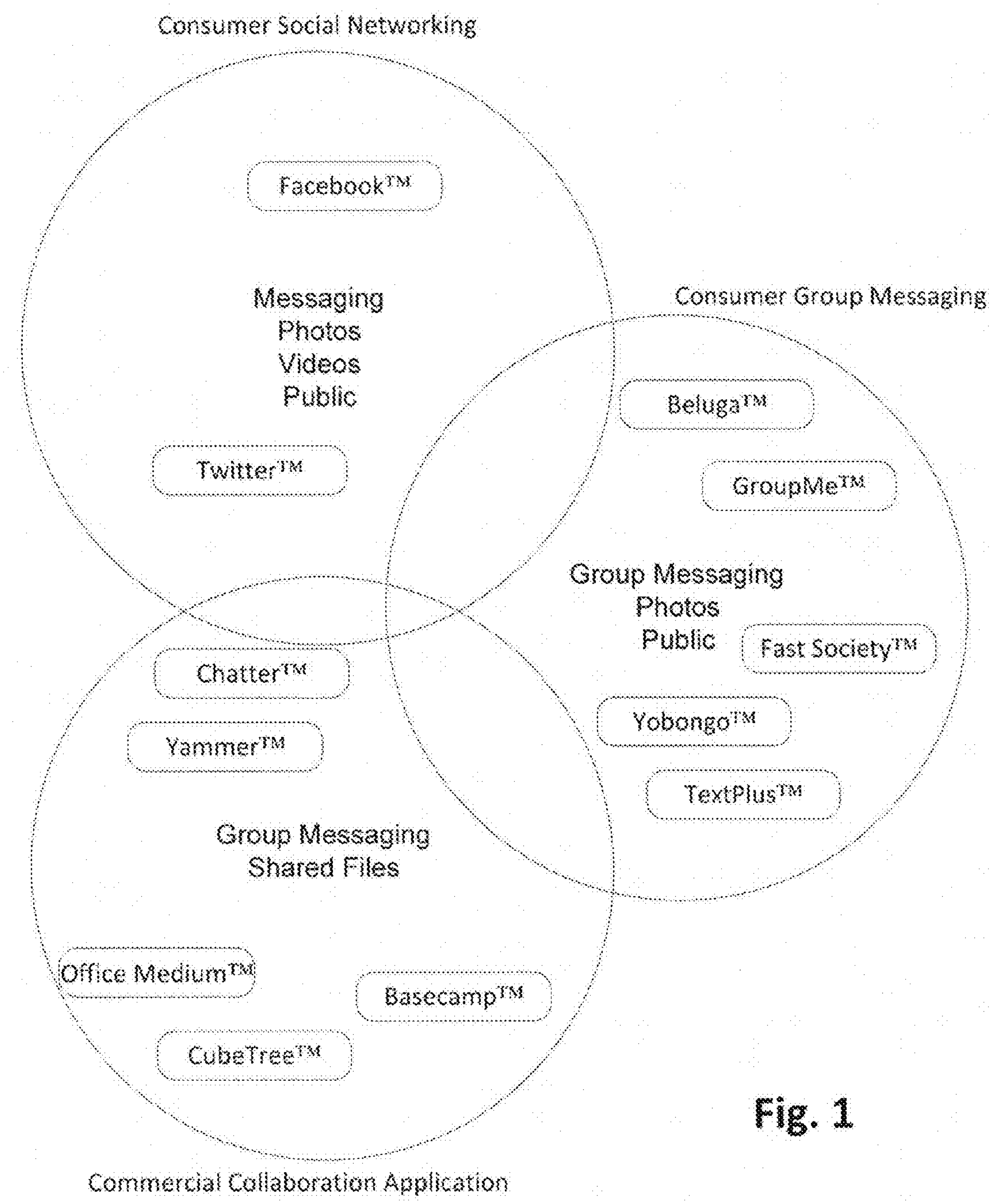
FIG. 1 illustrates an integration of communication, according to an embodiment.

Referring now to the drawings, wherein like reference numerals designate identical or corresponding parts throughout the several views, FIG. 1 illustrates how embodiments described herein integrate one or more realms of communication together to form an integrated and unified realm. Communication realms indicate various services that provide different types of communication paradigms. For example, communication realms can include consumer social networking, consumer group messaging, and commercial collaboration applications. The consumer social networking realm may include features such as messaging, photos, videos, and public domains. Two consumer social networking entities include Facebook™ and Twitter™. However, several other established entities exist within the consumer social networking realm. The consumer group messaging realm may include features such as group messaging, photos, and public domains. Consumer group messaging entities include, but are not limited to, Beluga™ GroupMe™, Fast Society™, Yobongo™, and TextPlus™. The commercial collaboration application realm may include features such as group messaging and shared files. Commercial collaboration application entities include, but are not limited to, Chatter™, Yammer™, Office Medium™, Basecamp™, and CubeTree™. Embodiments described herein integrate some or all facets of social networking, group messaging, and collaboration into a single realm to provide a unified communication experience having decreased communication clutter.

Figure 2A:
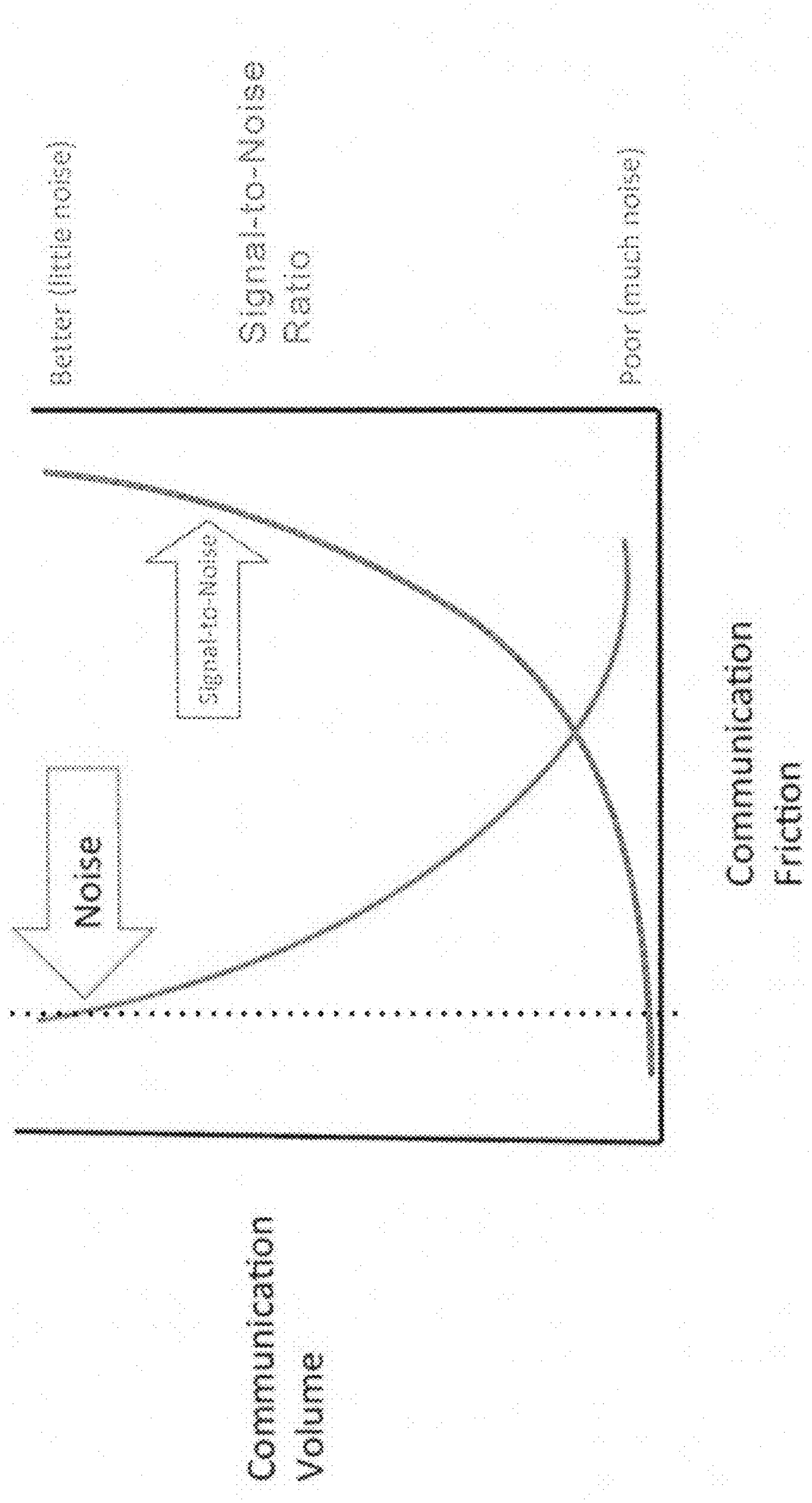
FIG. 2A is a graph illustrating a communication signal-to-noise ratio.

FIG. 2A is a graph which illustrates various realms of communication in light of communication volume, communication friction, i.e. an ease of sending a message, and signal-to-noise ratio (i.e. relevant communications to unrelated or unnecessary communications). With the explosion of communication and modes of communication in recent years, conversations can take place simultaneously over several competing channels, which create confusion and inefficiency, thereby requiring multiple changes in context. In addition, the ability to access and organize prior content easily and seamlessly across all communication channels becomes more challenging. The graph of FIG. 2A illustrates this problem by graphically indicating that when communication gets easier (less friction) and communication volume increases, communication noise increases exponentially. As a result, it becomes very hard to identify, organize, and focus on messages that are relevant or important, i.e. the communication signal, while also maintaining easy communication paradigms. Accordingly, the communication signal-to-noise ratio is only good within a small window, which drops rapidly.

Figure 2B:
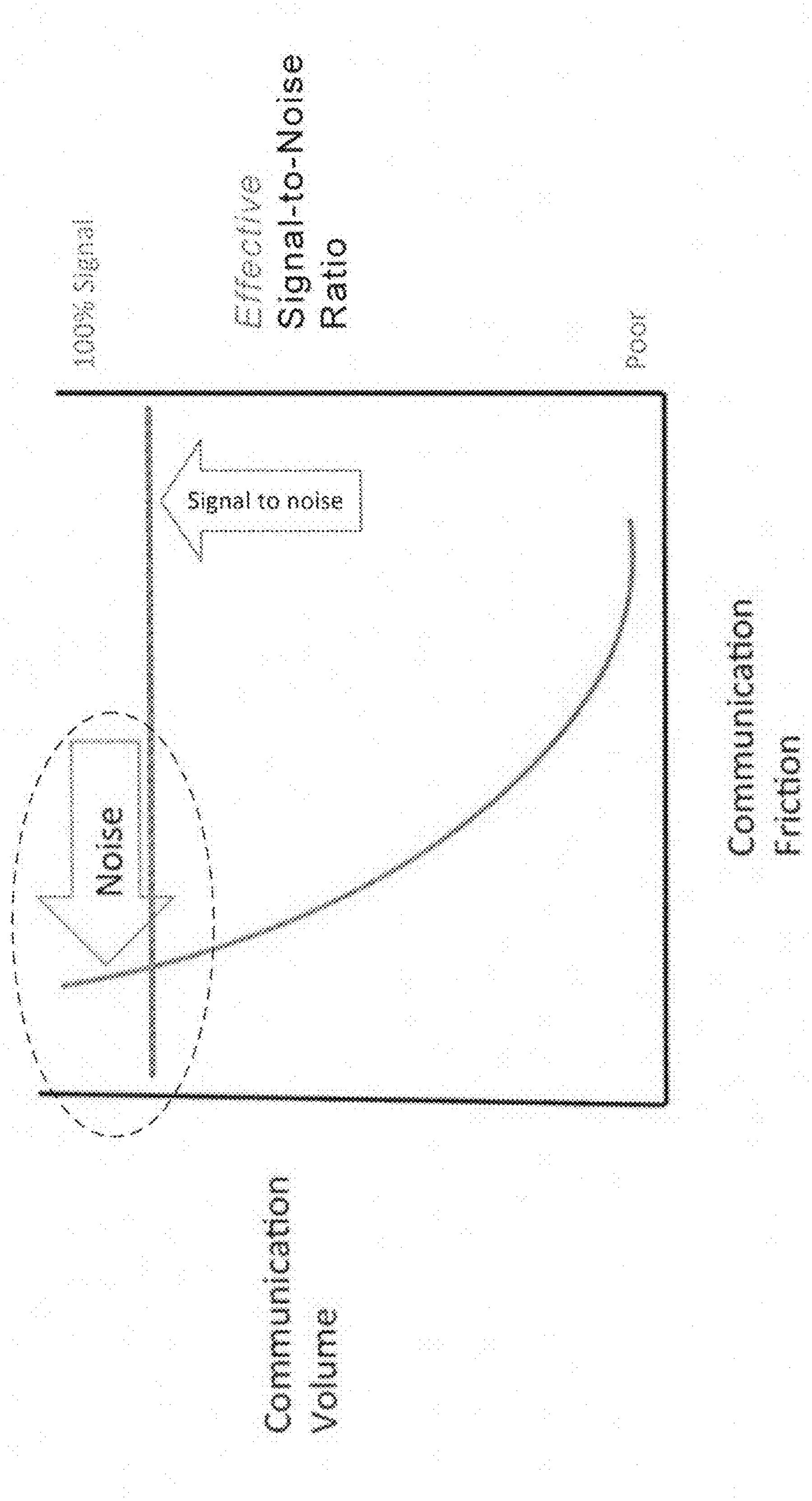
FIG. 2B is a graph illustrating a communication signal-to-noise ratio, according to an embodiment.

The graph of FIG. 2B illustrates an effective communication signal-to-noise ratio according to embodiments described herein. Even as the noise level increases dramatically due to increased communication volume and decreased communication friction, the effective communication signal-to-noise ratio stays high. In other words, the amount of relevant and related communications becomes easier to identify and manage, even as communication volume is increased due to easier communication paradigms provided by the system described herein. Thus, as will be described herein, embodiments provide the tools for important and relevant communications to take a "front-and-center stage" for immediate reception and easy organization by a communication recipient.

Figure 3A:
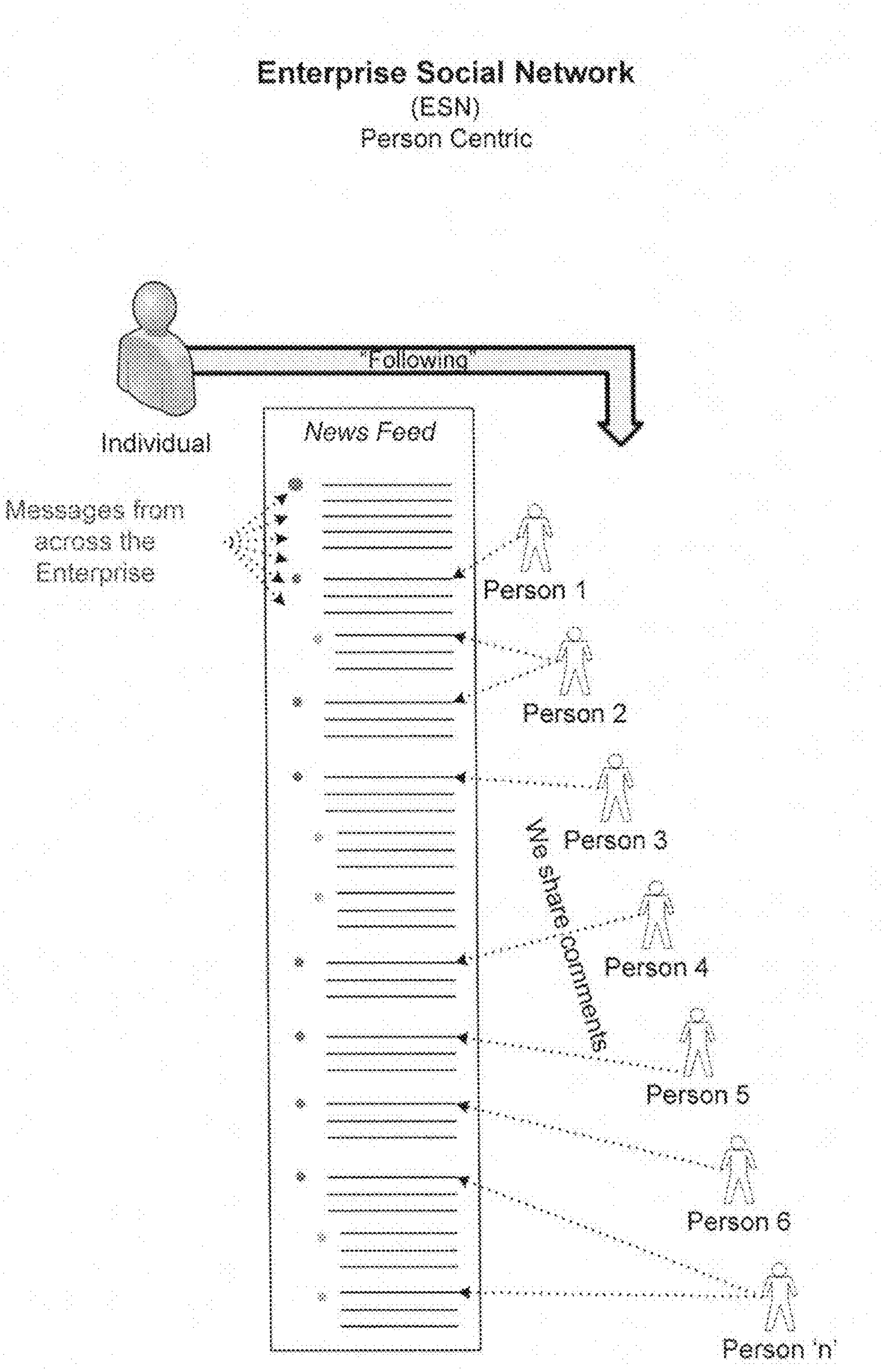
FIG. 3A illustrates a communication scheme.
Figure 3B:
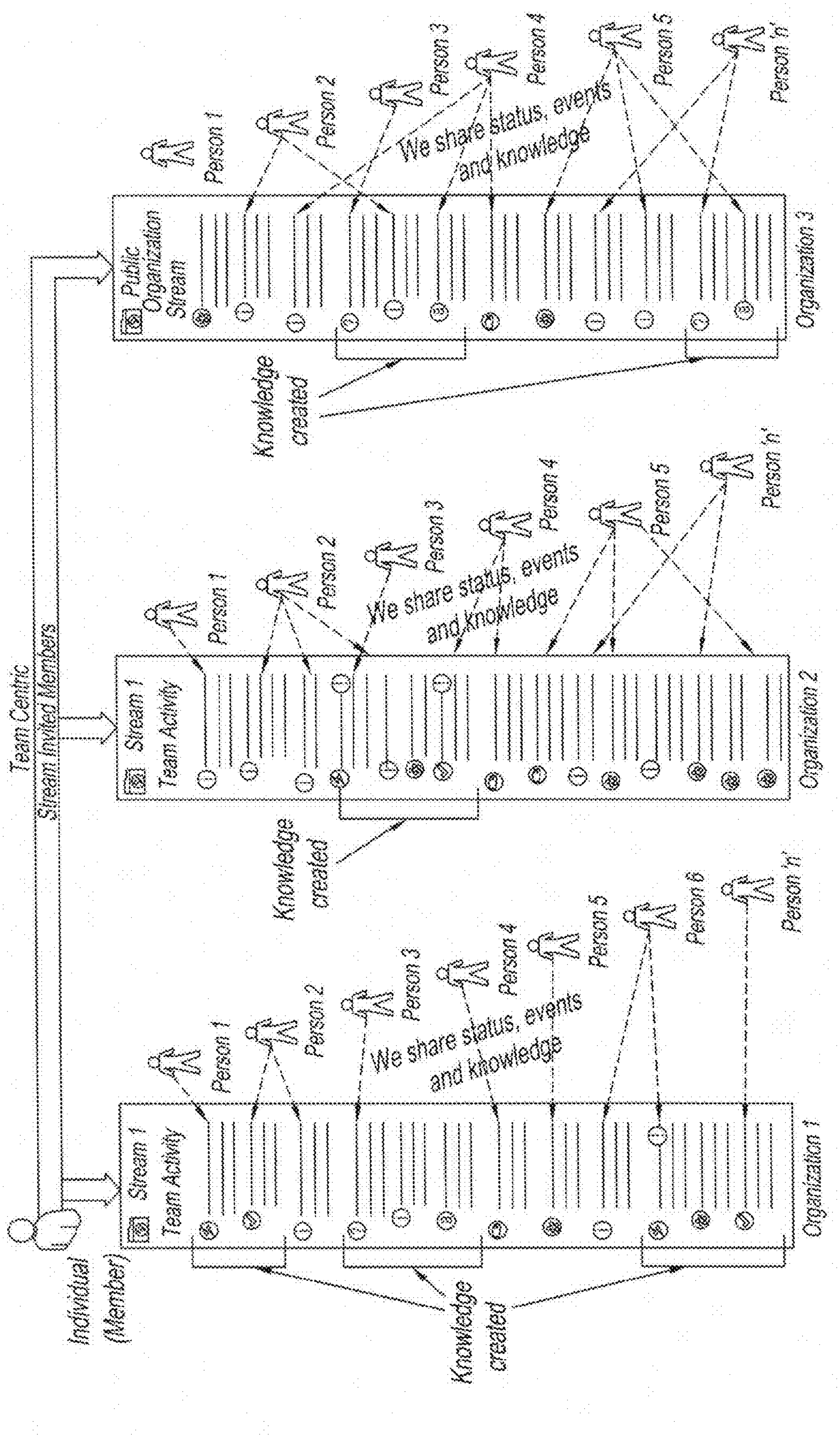
FIG. 3B illustrates a communication scheme, according to an embodiment.

FIG. 3A illustrates a person-centric mechanism of communication, as compared to a team-centric communication mechanism illustrated by FIG. 3B according to embodiments described herein. As illustrated in FIG. 3A, an individual will receive messages from every person who is related (i.e. friend, group member) to the individual, thereby providing a cluttered newsfeed of both relevant and irrelevant messages. For example, a person may receive information from one related member relating to a project the individual is working on, which may get lost due to additional message clutter/noise from the plurality of other related members. Thus, conventional communication schemes are person-centric, wherein all facets of communication flow on an individual entity basis as input and output.

In contrast, embodiments described herein and as illustrated by FIG. 3B are team-centric. A team-centric concept more accurately describes our real lives, which makes this a successful and accurate model. As an example for illustrative purposes only, our lives may contain a family component, a work or career component, various social components, a recreational component, a medical/health component, an educational component, etc. Rather than crush each of these components into the same communication bin, embodiments described herein separate these components into individual streams, where a stream is defined as a private message stream for a defined group, created by a team leader or owner. In the example described above, an individual may be a team leader in some of the streams and a team member in other streams. As another non-limiting example, a stream owner may generate multiple streams designating individual work projects. Each stream may have some overlapping team members as well as different team members based on who is assigned to work on the various work projects. Further, sub-streams can be created as further described herein, where a subset of team members may be involved based on the particulars of the project and a desired level of granularity.

Figure 4A:
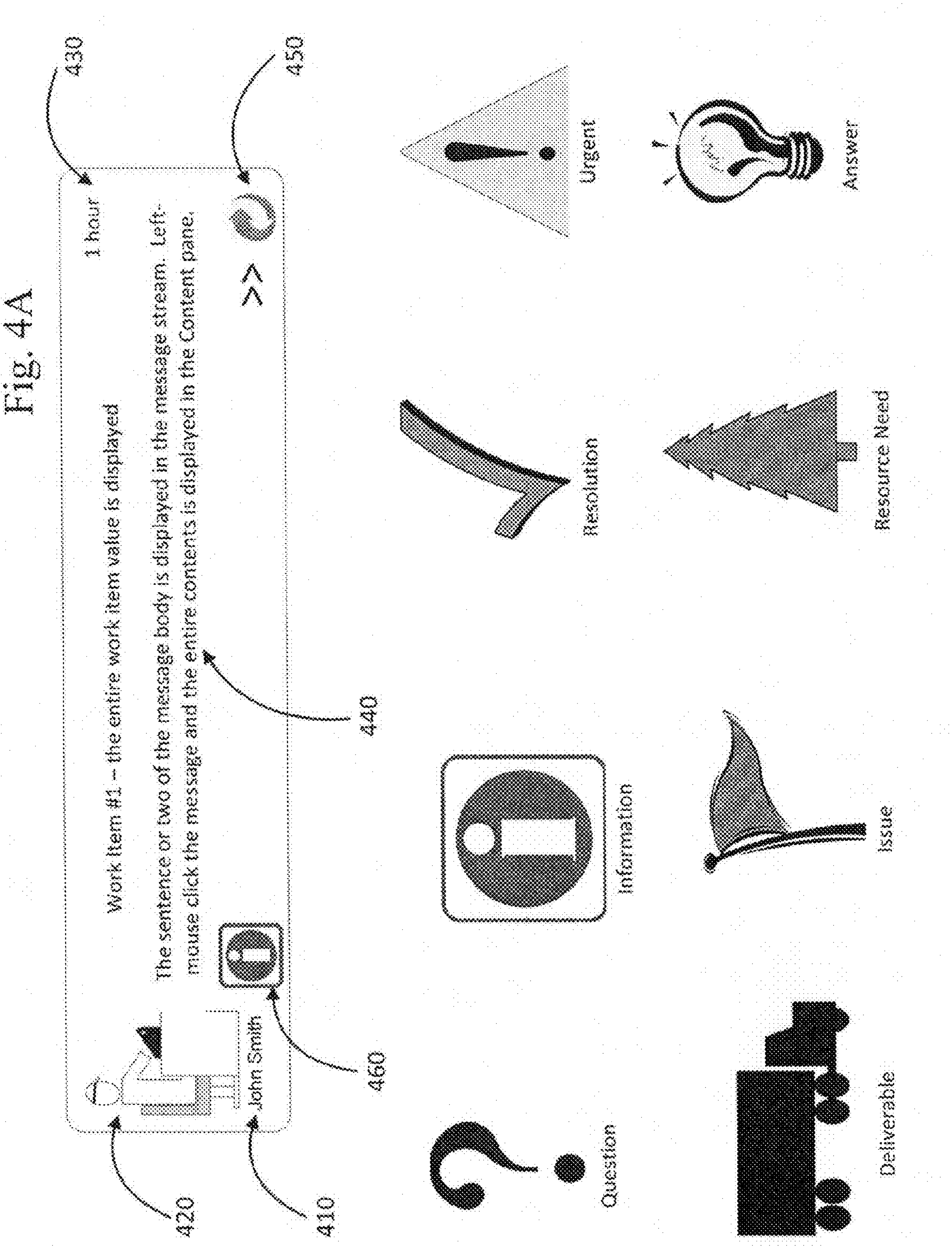
FIG. 4A illustrates the components of a message, according to an embodiment.

FIG. 4A illustrates the components of a stream message 400 according to one example. An upper portion of the stream message 400 illustrates the message author name 410, along with a picture of the message author 420, and the age of the message 430. The message 440 is illustrated in the body of the stream message 400. To save on memory and to ensure succinct and "to-the-point" messages, in one embodiment, the message 440 may be limited to a certain amount of characters or sentences. However, in other embodiments, the message 400 may contain as many characters as the message author 420 requires to convey the message. Further, in an embodiment, one or two sentences of the message body are displayed in the message stream itself. However, more of the message or the entire contents may be displayed in a content pane, as illustrated further herein. Alternatively, or in addition to, the stream owner may set a predetermined amount of characters and/or sentences to be visible in the message stream Several other embodiments can be utilized, in addition to or in combination with that described previously, to meet the needs of the stream users. A message tray 450 may be included in the stream message 400 and can include executable icons or indicators illustrating actions, such as "reply" or "more content." These types of actions would easily allow a stream member to reply to the message or to see if there is any additional content which cannot be viewed in the current stream message 400 pane. A message type indicator 460 icon may also be included on the lower left side of the stream message 400. The message type indicator 460 indicates what type of stream message 400 the message author 410 has created, thereby providing an easy way for a stream member to come up to speed on what the message is about or how it may relate to other messages in the stream. A stream is a way of identifying, via words or visual indicators, the relevance and importance of the message. Some of the basic icons could be representative of information that is being provided in the stream message 400 itself, such as a deliverable, a question asked, information provided, an answer provided, an issue, a resolution, a resource needed, a comment and/or an urgent message. However, several other message types and their respective icons are contemplated by embodiments described herein, which can be customized and extrapolated upon to meet the needs of the stream members.

Figure 4B:
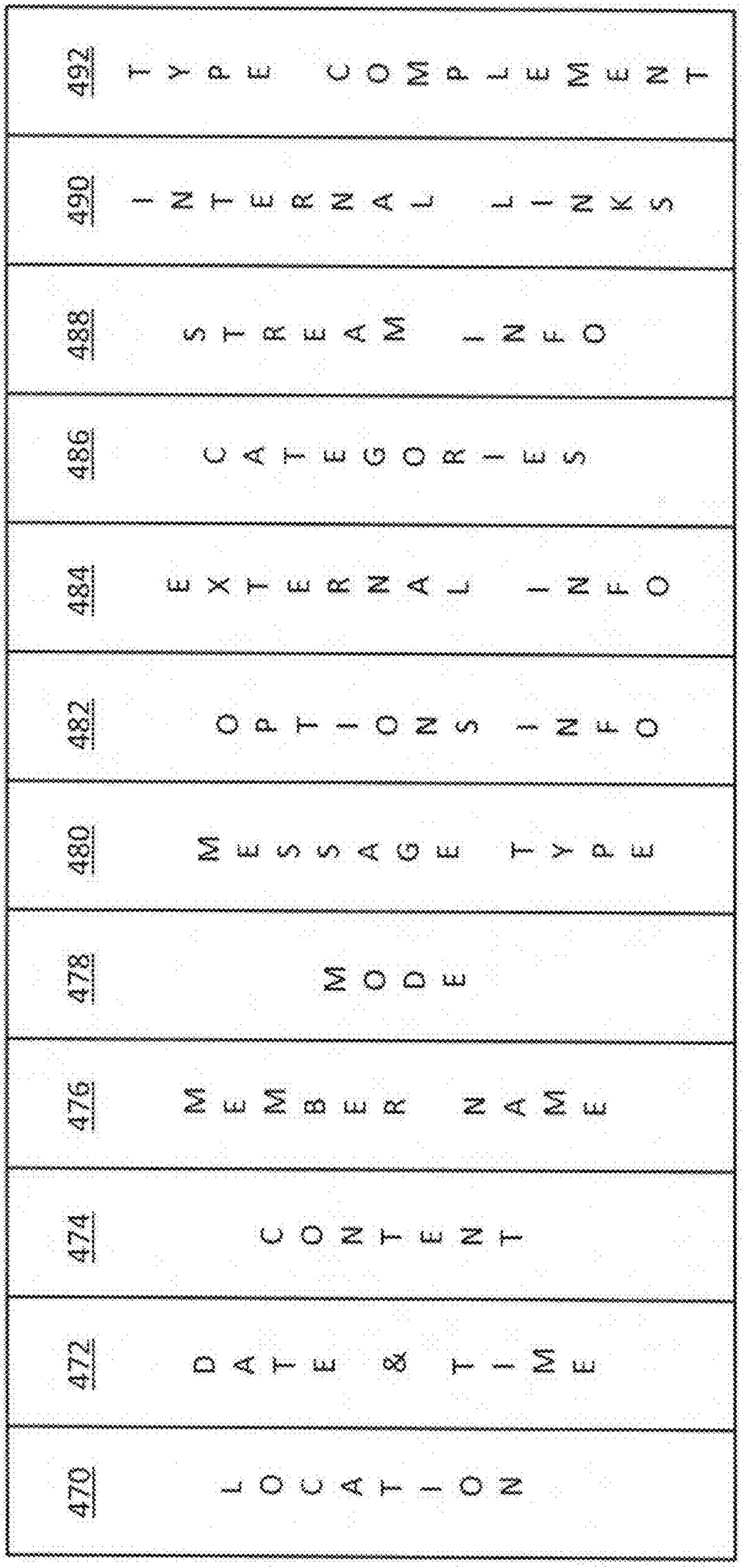
FIG. 4B illustrates message information, according to an embodiment.

FIG. 4B illustrates stream message information according to one example. As such, FIG. 4B illustrates a non-limiting example of a data structure for storing a stream message and the information related thereto. As illustrated in FIG. 4B, the stream message includes, but is not limited to a plurality of information such as location data 470, data and time information 472, content 474, member name 476, mode information 478, message type 480, options information 482, external links or information 484, categories 486, stream information 488, internal links 490, and type complement 492. The location data 470 can indicate a location at which a stream member is located who posted the message. The location data 470 can be predetermined and statically assigned or it can change based on where the stream member is located when posting a message. The date and time information 472 indicates a date at which the message was created or posted along with a start time and an end time for the message. The start and end time can vary, based on the type of stream message. For example, a stream message that is posting information may have a similar start and end time as the message is merely reporting information to other stream members. However, a message having a question may have a different end time, representing a time at which the poster of the stream message requires an answer. In select embodiments, these times can be automatically adjusted based on the location data 470 and time zone differences, thereby ensuring that all deadlines are accurately met and that stream members can easily come up to speed on the progress or status of stream members and stream content.

The content information 474 includes information representing the content of the message to be conveyed to the other stream members. For example, the content may be textual information, audio information, or video information. The member name 476 includes the person creating or posting the message. The mode information 478 indicates the mode of a particular stream message. In select embodiments and as a non-limiting example, the mode 478 of a stream message can be a message format, task format, video meeting format, recorded audio meetings, or chat log transcripts. In other words, a stream member may choose to post a message to the stream and would therefore select a message format mode. If a stream member wants to assign a task or post a task to the stream, the stream member could select the task mode. Further, if a stream member wants to initiate a meeting, the stream member would select the associated meeting mode. It is contemplated that the meeting mode also includes non-limiting examples, such as a teleconference mode that may be audio-only, text, or any combinations thereof.

The message type information 480 includes information identifying the type of message that is being posted to the stream. The message type information 480 may defined differently for different streams and can be utilized to identify status events or milestones that relate to managing the progress towards an accomplishment of an objective relating to the stream. As described previously, non-limiting examples of message types include information, comment, feedback, concern, question, answer, issue, resolution, and deliverable. However, other message types may be manually generated by a stream owner or generated by another system, as described further herein. The information message type indicates that a stream member is posting information about a certain topic, condition, event, or perhaps a status update with respect to an assigned task that has been posted to the stream. The comment message type indicates a comment a stream member may have with respect to a certain topic within the stream or with respect to another message that has been posted by a different stream member. The feedback message type indicates feedback that a stream member may have provided to another stream member. For example, one stream member may be seeking thoughts on something they have posted or on a project they are working on, and another stream member can reply with feedback. The concern message type indicates that a stream member may be concerned with something that is contained within the stream. For example, a stream member may express concern with respect to a deadline of a particular task or with respect to feedback or answers that another stream member has posted on the stream. Other examples may be contemplated for each message type as to how the message type applies to the stream.

The question message type indicates that the stream member has a question with respect to a certain topic. The stream member can thereby post a message having a question message type, thereby providing an impetus for other members of the stream to answer the question upon seeing the message type. The answers are posted in response to the question and therefore have their own message type. Issues are another message type that can be utilized by stream members to indicate a problem they may be having with a particular task or if they may not be available at certain times or dates for a particular meeting, for example. Like with the question/answer message type paradigm, a resolution message type may be provided which posts a stream message indicating a resolution to the issue. For example, one stream member may indicate that he'll be available for the meeting and can take the place of another stream member who may not be available. The deliverable message type indicates that a deliverable is required for a particular task, assignment, or project within the stream. It allows other stream members to know that a deliverable will be required upon completion. The deliverable message type may also indicate that the stream member is posting a deliverable in response to a previously assigned task, project, and/or other assignment or objective.

As described herein, to provide stream members with an easy understanding of what is taking place on the stream, each message type comes with a distinct icon or other visual or graphical element that is displayed within the stream message 400, thereby allowing a user to quickly grasp the type of each message. Further, in select embodiments and as described further herein, stream members may be required to select a message type 480 when posting a message to the stream. Therefore, in a stream of messages which already have decreased clutter due to their content being directed to a particular stream, the system further reduces communication clutter by allowing stream members to quickly peruse stream messages by message type. A stream member tasked to resolve any issues within the stream may focus on messages having a question message type or issue message type, thereby allowing the stream member to efficiently manage his time within the stream. Further information with respect to the message type 480 information is provided herein, particularly with respect to FIG. 7.

In selected embodiments, the system may limit the amount of message types 480 that can be generated by the stream owner to a predetermined value. For example, the system may limit the number of message types to seven. The stream owner has the option of placing this limitation on the number of message types or allowing an unlimited amount of message types. Limiting the number of message types 480 prevents an overwhelming amount of various messages having a myriad of message types 480 which has the potential to introduce noise into the communication stream.

The options information 482 can include, but is not limited to information such as whether the message is urgent, whether any links are to be included within the message, whether files are uploaded with the message, and whether the message is for internal use only. When a message includes links and/or uploaded files, this information is also stored along with the message in the form of external information 484, which includes the links or provides pointers to the stored location of various uploaded files. In select embodiments, the message data structure itself can store the uploaded files as well.

The categories field 486 of the message can include information that is established by a stream owner, such as whether the message relates to a certain activity taking place within the stream. Accordingly, the categories field 486 may be used to relate messages to other aspects of a stream's activity, such as project management, timesheet, or other tracking system identification codes or activity categories, due dates, occurrence dates and the like. For example, the message being posted may be related to a particular task and therefore the user may select from a list of tasks included within the stream when posting a message. Thus a message created using a particular category field will have a category indicator located within the message to alert other stream members of the particular category the message relates to in the stream. This indicator can be textual or a visual indicator. A category field can be called any name that is relevant to the particular stream activity that describes the items in the list. Another example of a category field is "activity." The "activity" category field would list individual activity items within that field. Other examples of category fields include, but are not limited to "start time," "end time," "due date," and "state." A category field can also be specific names, such as a listing of all committees in which the user is a participating member.

Accordingly, various category fields can be generated based on an objective of the stream and activities within the stream. For example, a project manager might use the "start time" and "end time" category fields 486 as well as a "state" category field indicated a state in which a stream member performed the activity. A "work item" category field may also be included having a list of project/task codes for Timesheet and Work breakdown structure reporting. A Board of Directors may define other category fields such as an Activity List of items having items such as "Board of Development Committee," Country Evaluation," Executive Committee," Finance Committee," "full board" and "Policy Committee."

Thus, the category fields 486 provide an increased layer of noise reduction by allowing stream members to relate messages to activities relating to an objective of the stream. They also provided enhanced filtering opportunities as the system can filter various stream messages based on the category field 486 to quickly determine the status of the particular category fields 486 or a general status of overall stream activity. Further, the system can combine this filtering technique with the filtering techniques described herein with respect to the message types to provide a more fine-tuned filtering of messages that relate solely to a particular category field 486 as well as a message type 480. For example, with respect to the above-noted example of the Board of Directors stream, a stream owner or stream member could generate status reports to determine the amount of issues that have arisen as well as the amount of issues that have been resolved based on message type but limit this inquiry solely to issues resolution on the Board Development Committee.

The stream information field 488 indicates the stream to which the message is assigned. Accordingly, communication clutter is decreased and the signal-to-noise ratio of communications is increased by having messages assigned to particular streams, rather than having one newsfeed with a plurality of information from a variety of sources. Further, in select embodiments, messages can be posted to one or more streams, if the message is relevant to different streams. For example, if a project at an enterprise is separated into three streams having teams that may need to coordinate between projects, one stream could be devices for this coordination, or stream members of the various streams could post messages on other streams to improve communication between the groups while maintaining a high signal-to-noise ratio.

The internal links 490 indicates that the message is linked to other messages within the stream. For example, if a stream member replies to a particular message posted in the stream, the two messages will automatically be linked. Any additional responses to either of these messages will cause the additional messages to be linked to one or both original messages. Alternatively, or in addition to, links may be formed based on the message types indicated within the stream messages. For example, links may be formed based on question/answer relationships or issue/resolution relationships. As further described herein, this link information can then be used when generating reports to determine statistics with respect to these message types. The linking may be created via linked lists, data stacks, or other data structure methodologies as would be understood by one of ordinary skill in the art. Further, relationship rules or complimentary message rules can be generated for the various message types such as question/answer. Accordingly, if a stream member posts a stream message having a question message type and another stream member posts a response having an answer message type then these two messages would satisfy the complimentary message rule thereby forming a link or correlation there-between. This correlation can then be use when filtering messages to determine which messages having a correlating message type of been linked with a corresponding complimentary message and which messages have not been linked. For example, the system, based on the message types can filter a list of messages based on message type to determine how many messages of each message type exist. The system can also filter, alone or in conjunction with a message type filter, based on the correlations analyzed between messages to determine, for example, how many messages have been posted with a "question" message type and how many responses to that question have been posted, if any, having a corresponding "answer" message type. Therefore, the system can identify how many correlations have been formed between messages having complimentary message types based on the complimentary message rules to generate metrics on status and milestones with respect to these particular message types.

The type complement 492 is included within the message information when a particular type of message type is selected by a stream member which contains a message type complement. For example, a question message type has a message complement of an answer message type. Therefore, if the stream member selects a question message type, the system generates an additional field in the message information data structure for the message type complement. This field can include, in selected embodiments, a flag indicating whether or not a response has been generated that complements the message type created upon generation of the stream message (i.e. answers the question). In select embodiments, the system can determine that a message complement has been generated by traversing every message in the stream and selecting messages that have "answer" message types. The system could then determine if the answer messages posted to the stream are within a predetermined time or date of the originally posted question message. In select embodiments, the system may traverse the information included within the internal links field 490 of the originally posted question message to identify all messages that are linked with the originally posted message. In doing so, the system immediately filters out a large amount of the messages on the stream. The system can then quickly traverse the internally linked messages based on message type and efficiently filter any messages that do not contain an "answer" type message indicator. Once the system identifies all answers within the internally linked messages, the system can automatically flag the complement field 492 that the question has been answered. Alternatively, or in addition to, the system may filter through all answer message type responses and only flag the type complement field 492 to indicate the question message has been answered, if an answer message type is found to have been generated within a predetermined (or established by stream owner) time with respect to the question message post time and/or it was posted by a particular stream member. Whether or not a complement type field 492 is to be generated at the time a message is generated can be determined by relationship rules of the particular message types as described further herein, particularly with respect to FIG. 8.

The message stream 400 provides an immediate and condensed, yet complete, view to be portrayed in a message, such that stream members can easily understand the latest news in the stream and/or come up to speed on the current state of affairs with respect to the stream or stream members. While a stream member can dig deeper into the details of the message, the format of the message stream 400 described herein reduces communication clutter by providing a quick identification of the contents of the message, how the message is related to other messages, other stream members or the content of the stream itself. Further, requiring stream members to include the message type indicator 460 helps to keep the messages focused and related to the particulars of what the stream was created for in the first place.

An example will be given for illustrative purposes. Since this is a stream message, as opposed to a regular conventional message, it is evident to the recipient which area or component the message is pertaining. For example, this may be the medical/health stream discussed above and therefore, any team member of the stream reading a stream message knows that the stream message has content relating to medical/health information. In addition, since each stream member is admitted by invitation only (although in other embodiments a stream may be open for members to join at will), the recipient can assume that all messages and content within the stream should be somewhat relevant, as opposed to junk mail. Accordingly, merely by the creation of a message stream itself, the amount of clutter in communications is reduced thereby increasing the communication signal-to-noise ratio. Further, in the example medical/health stream, a message author 410 may be a family member's doctor, and the stream message 400 content may state that the medical records of Child A have been forwarded to Hospital B. In addition, a "deliverable" icon could be displayed as a message type indicator 460 to indicate that an order or request has been filled. Thus, in a mere few seconds of review, the recipient or any other stream member can quickly determine that a medically-related request has been completed.

Figure 5:
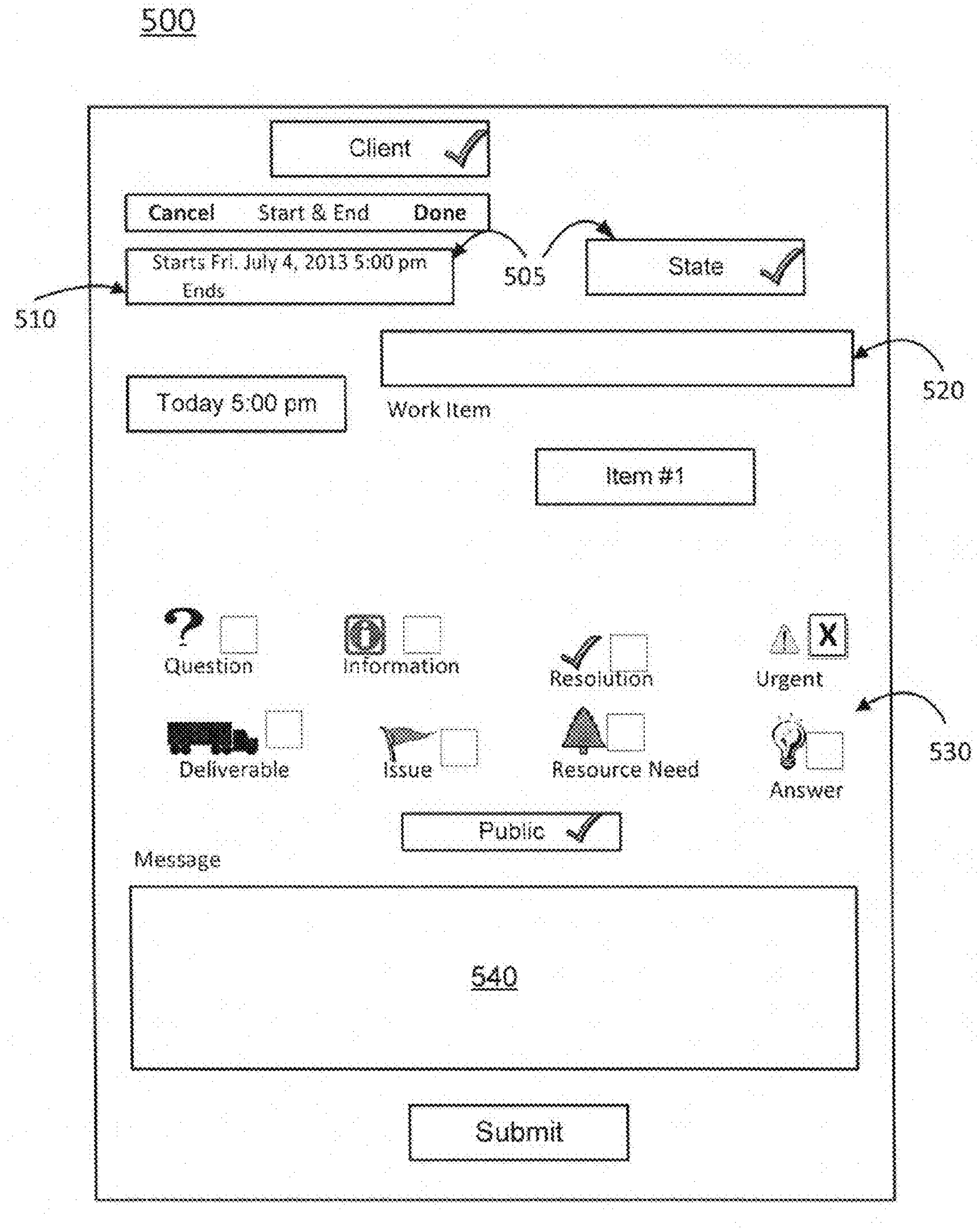
FIG. 5 is a screen shot of a message entry, according to an embodiment.

FIG. 5 illustrates a screen shot 500 in which a message stream 400 can be entered into a stream according to one embodiment. The screen shot 500 illustrated in FIG. 5, as well as additional screen shots described herein, are given for illustrative purposes only, and can include additional or alternative features to those illustrated therein. Certain features can be automatically populated or default populated, such as the location and starting date and time 505. This can be determined based on a current time and established location of the user within the message stream. However, the computer may also automatically determine the location of the user, based on his/her computer IP address, geo-location sensor data, wireless networking triangulation, or other means. It could also be determined, based on his/her location via GPS if they are posting from a remote location via a smart device, as would be understood by one of ordinary skill in the art. The starting date and time can also be adjusted to a particular date in the future, thereby representing for example, that a particular task does not start until that future date.

An ending date and time 510 can be completed for a particular project or assignment, along with a work item 520, which could be a name or number. Further, if a stream member is merely posting information or a comment, the ending date and time 510 may represent a current time at which the stream message is being posted to the stream. In the center of the screen shot 500 are a list of message type indicators 530 and their associated icons. As described previously with respect to FIG. 4A, these message type indicators 460 appear in the stream message 400 and represent the type of message being posted, so that a stream member can quickly grasp the meaning of the message or quickly peruse a plurality of messages. Referring back to FIG. 5, a message area 540 is also included, which allows a stream member to enter the message content which is going to be posted to the stream. Since the screen shot 500 includes several separate areas to identify various parameters of the message, i.e. start and end date and time 505 and 510, work item 520, and message type indicators 530, the message area 540 does not need to be lengthy (although it could be), as other stream members will likely be able to quickly grasp the meaning and relationship factors of the message. Further, if the stream message is being generated in response to another stream message included in the message stream, it will be linked to the other message as described previously, which will further provide a stream member with an easy understanding of what the message relates to both in terms of content and what the content relates to with respect to the message stream.

Returning to the medical/health stream and as an example for illustrative purposes only, the medical/health stream may include a plurality of stream messages 400 relating to medical and health information of particular stream members. A first stream message may be a question from a stream owner/member having a designated question icon as the message type indicator and may be an inquiry as to a delivery date of a particular medication at the Pharmacy (the Pharmacy being a member of the stream). In this example, the Pharmacy stream member may respond with a second message having a message type indicator indicating that there is an issue and having message content indicating that the Pharmacy has not yet received the prescription from the doctor. This response message from the Pharmacy will then be linked to the original message from the stream owner/member, as described above. A third stream message posted to the stream by the stream member doctor may include a stream message having a resolution message type indicator, as well as a linked file containing the prescription for the Pharmacy. This message will then be linked to both the first and second messages and will also contain information indicating the previously posted issue has been resolved. This relationship value is important as described further herein when generating reports. Therefore, the system can easily track messages in an efficient manner, thereby allowing the stream owner/member to easily track answers to his/her inquiry about the medication. Also, other messages that are not linked (i.e. that were not in response to a previous message) to the stream owner/members inquiry with respect to the medication will still be readily accessible, as they relate to the stream itself. Therefore, it is very easy to track specific inquiries linked to a particular message or to view messages (whether in bulk or filtered by message type indicator) related to the medical health information stream itself.

Accordingly, this type of communication paradigm provides an easy way for stream members to come up to speed on the particulars of what is going on in a message stream. Contrast this communication paradigm to email, which may have some related messages back and forth in response to various inquires, but they will not have any type of message indicators indicating their content and they are not easily filtered by stream type. In the example above, the doctor may be a friend of the family and may have sent a variety of emails to the stream owner over a period of time. Therefore, when reviewing email, there will be an enormous amount of clutter that doesn't relate to any particular inquiry with respect to medication.

Figure 6A:
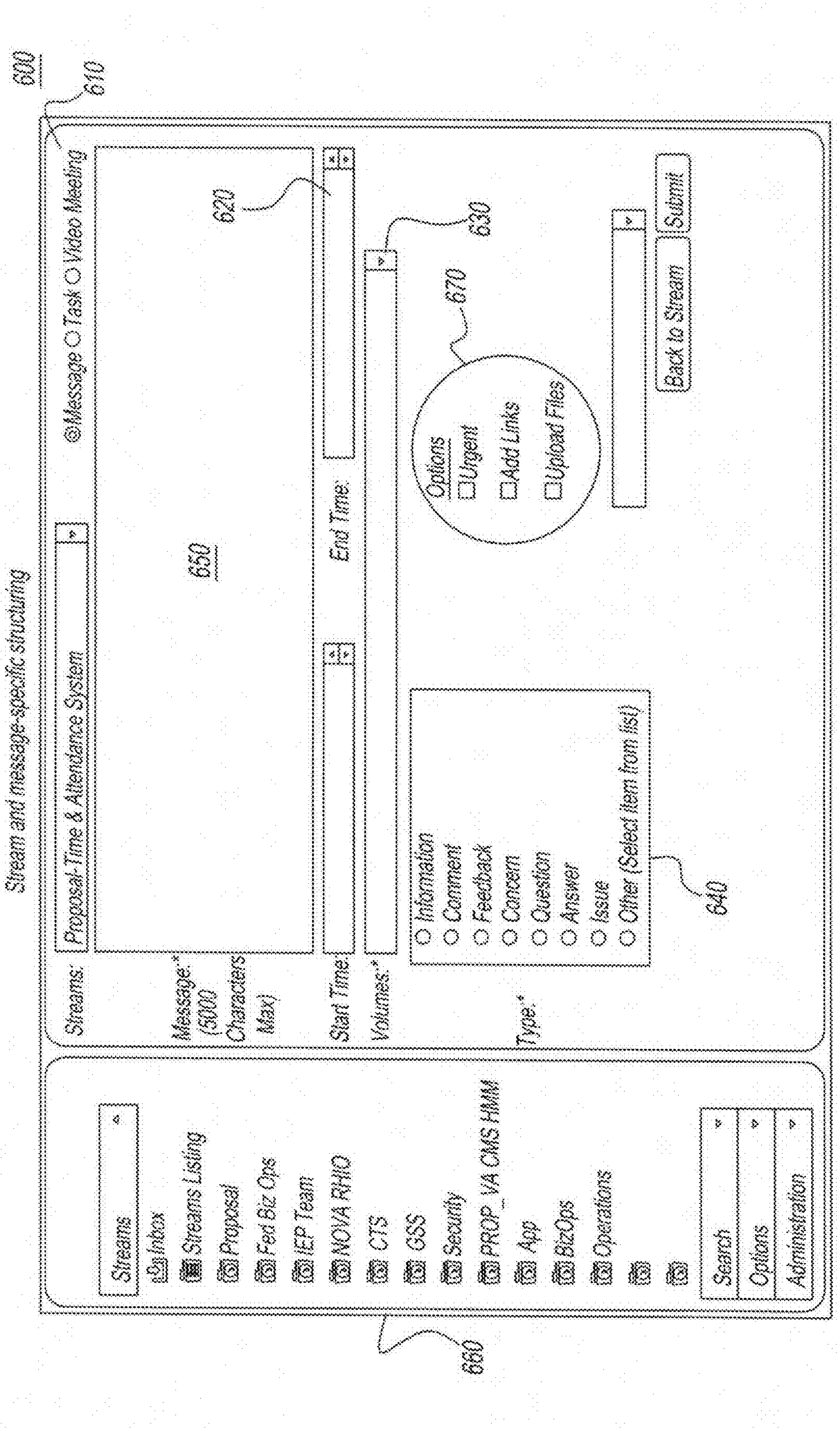
FIGS. 6A-6B are screen shots of fields of a message, according to an embodiment.

FIG. 6A illustrates another embodiment for a message screen shot 600, which includes a mode 610 such as message, task, or meeting, a date and time field 620, a category 630, a message type 640, and a message field 650 for inputting message content, and an options field 670. The category field 630 allows message data to be sorted, filtered, collected, and searched. The category field 630 of FIG. 6A can be used to list the volume or activity area. An example could be a proposal development, and the associated activities or volumes could be compliance matrix, debriefing, gap analysis, and management. However, other volumes, such as management volume, technical volume, or pricing volume are contemplated by embodiments described herein. The mode 610 allows a user to identify the mode of the message that is being posted to the stream (i.e. the Proposal-Time and Attendance System stream in FIG. 6A). The mode 610 allows for a message to be input as described previously herein. However, a selection of the mode 610 also allows the stream member to post a task to the stream itself.

In selected embodiments and for the task mode 610, a stream member may need a certain level of privileges or authority within the stream to be able to post a task or assign tasks to other stream members. Once a task is posted to the stream and if it is not specifically assigned to another stream member, other stream members may respond that they will work on the task. Since the task will include a start and end time, it will be easy to determine the duration of the task. Further, a message type 640 indicating an issue may, in selected embodiments, be automatically assigned to the post when a task is selected by a stream member. When a stream member posts a message indicating that he/she is willing to take on the task, that message will automatically be linked as described above to the task that was posted on the stream. Further, any resolution messages that are posted at a later date will be linked to the original task message and will signal completion of the task. The resolution of a task and links between related messages can then be used to generate status reports, as further described herein. Further, any type of resolution linked to other messages can be used to automatically relate these messages in a report.

The message type indicators 640 provide a variety of information with respect to the message as previously described herein and can include particular indicators, such as information, comment, feedback, concern, question, answer, issue, and other indicators that may be manually generated by a stream owner. As described previously in selected embodiments, a stream member will be required to include a message type indicator as part of their stream posting, thereby allowing other stream members to more easily track and filter messages within the stream. Certain message types 640 may also have causal connections when they are linked between various messages. For example, if a stream member posts a stream message having a "question" message type 640 and a follow up message is posted in response to the stream message (and linked to the stream message) and having a message type 640 of "answer," this information may be stored such that particular reports can be generated as described further herein. Similar applications are envisioned for issue and resolution message types 640.

The screen shot 600 also includes a navigation window pane 660 having various selections, such as the user's inbox, a listing of streams for the user, and a link to each stream in which the user is a member. If a particular stream has sub-streams included therein, the sub-streams can be accessed by clicking on the main stream, at which point a hierarchy of streams will be displayed as would be understood by one of ordinary skill in the art. Further, an options field 670 is included, which allows a stream member to mark a stream message as urgent or as an internal message only. Accordingly, a question posted with an urgent option field 670 would require prompt attention, whereas stream members would know not to discuss or forward any information or messages having the options field 670 of "internal use only." An "internal use only" may prevent stream members from outside the organization from viewing the message and any attached content. "External members" is another example of an options field 670. Other navigation features include, but are not limited to water cooler, discussion, search, user option, preferences, generate timesheet, status report, budget status, and change password.

Figure 6B:
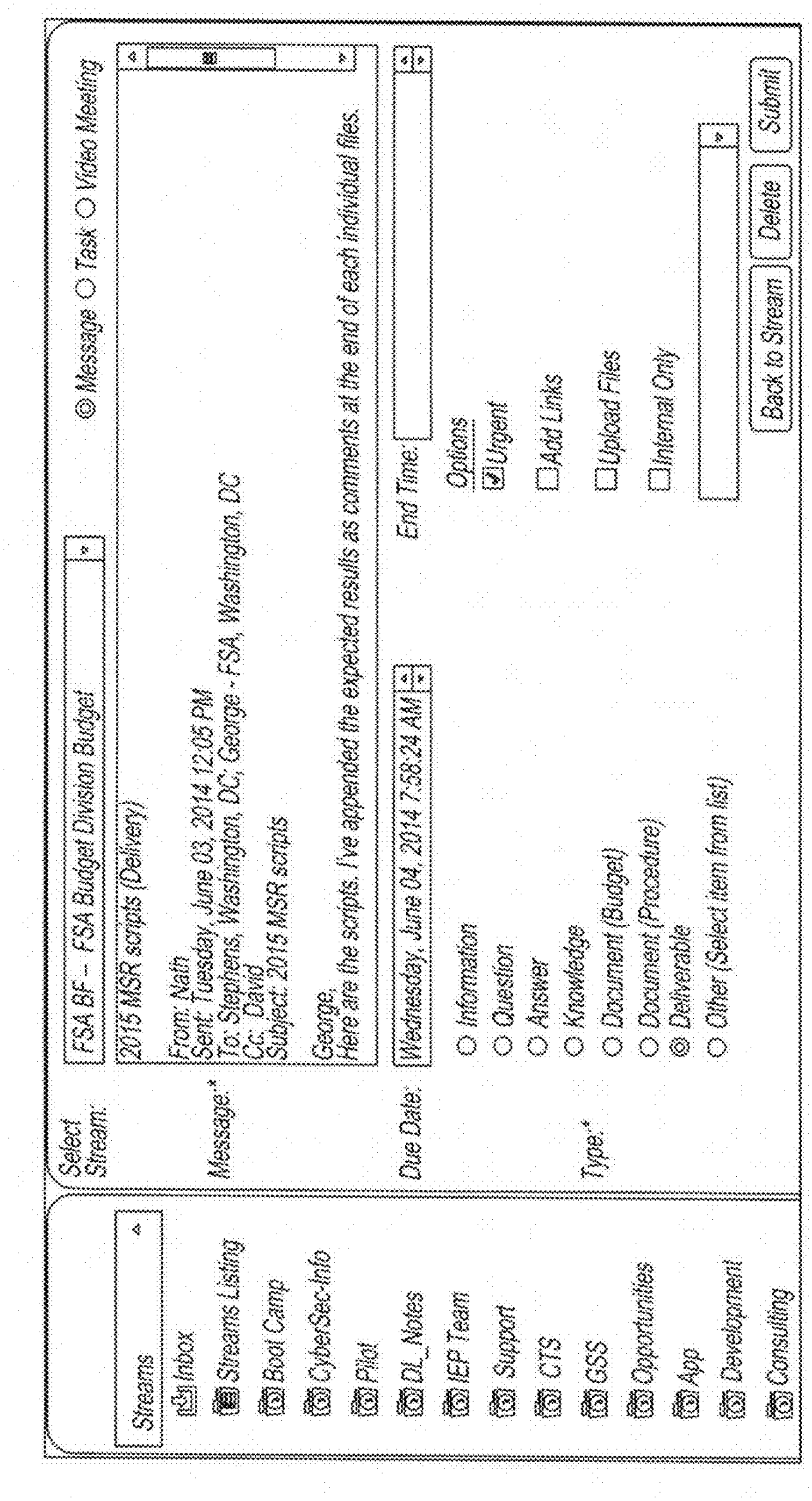

FIG. 6B illustrates a completed message within a particular stream. The message indicates the particular stream the message is operating under, the due date for the particular request or order, it is a deliverable message type, and it is urgent. A full message view can be obtained for complete viewing of the message, any links or attachments, and any related messages.

Figure 7:
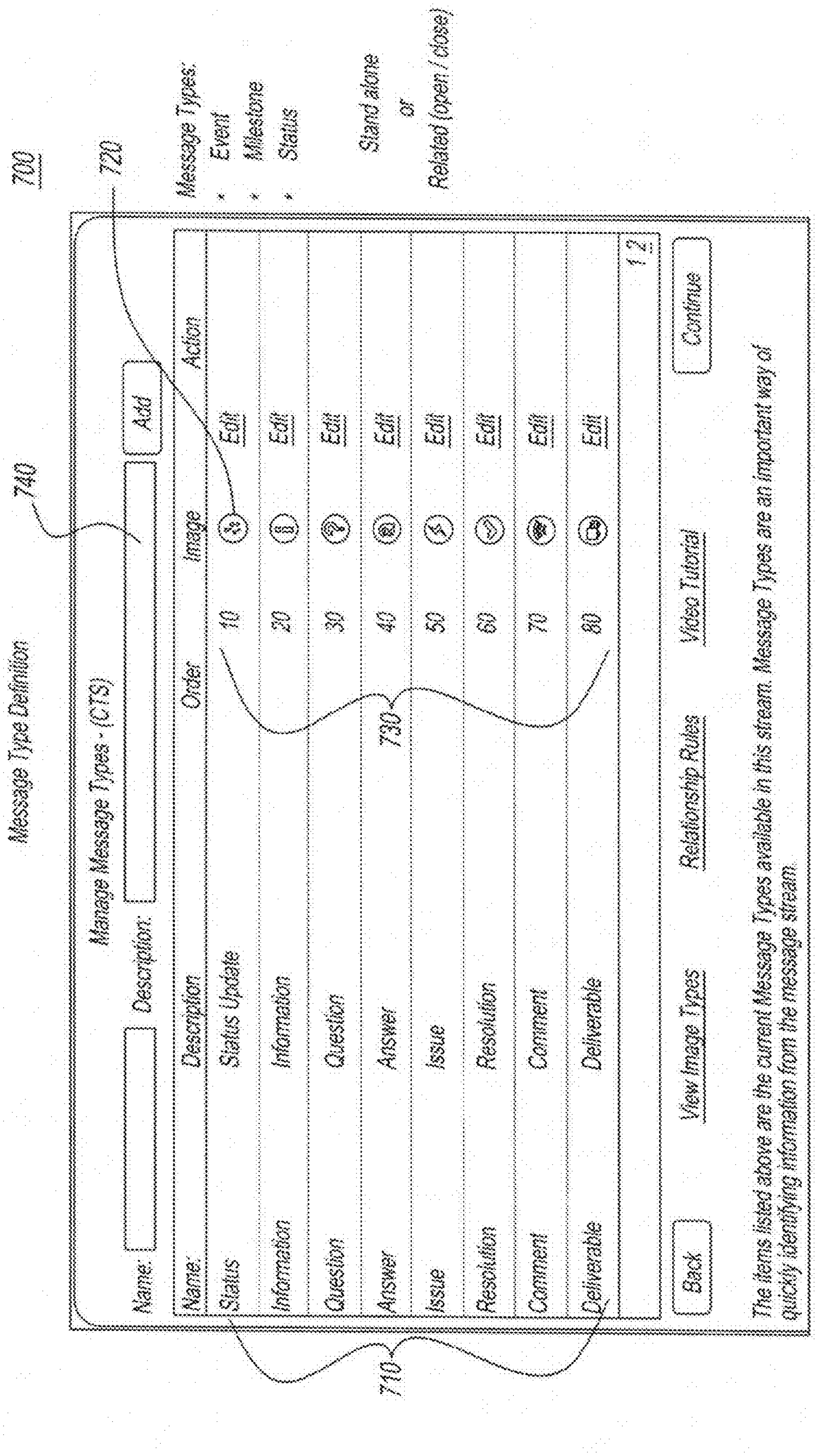
FIG. 7 is a screen shot of message types, according to an embodiment.

FIG. 7 illustrates a screen shot 700 for managing message types. As described previously herein, examples of message types 710 include, but are not limited to information, question, answer, issue, resolution, comment, and deliverable. Additional message types include an event indicating an event to take place, a milestone indicating that a particular milestone has been met with respect to a particular project or task, and a status indicating the status of a stream member with respect to a particular task or other assignment. An icon 720 is associated with each message type to portray a visual indicator of the type of message. However, any of the message types and/or associated icons and/or order can be edited if an alternative name or icon is desired by the stream owner. In addition, a numeric order 730 can be assigned to each message type. The order value allows the system to display the message types in a specified order, such as ascending numerical value, on the message entry form. Accordingly, a stream member or stream owner could predefine an order of stream messages based on message types that members use most often. In selected embodiments, the ordering of stream messages could be automated based on the frequency of use by members such that message types with a high frequency of use have are first in order with messages types of lower use frequency being lower in order. Alternatively, or in addition to, the system could automatically order messages based on the frequency of use of category types alone or in conjunction with the frequency of use of message types. Also, custom message types and associated icons can be added 740.

FIG. 8 illustrates an embodiment for message type relationships 800. Many messages have an anticipated counterpart or complimentary message as a follow-up. For example, an issue message type could be paired to a resolution message type, a task assigned message type could be paired with a task completed message type, a resource needed message type could be paired with a resource provided, and an invitation message type could be paired with an acceptance or rejection message type. Several other message type relationships are contemplated by embodiments described herein. These paired message types can be created by establishing complimentary message rules between various message types (i.e. question is paired with answer message type). As described previously herein, this type of relationship rule allows additional fields to be generated upon message creation, which allows the system to track whether additionally posted messages having complementary message types have been paired with a previously posted message. Message type relationships could also be grouped by one or both message types within the relationship. For example, a status report could be generated immediately for all issues which have not been resolved yet, all questions not answered yet, or all assignments for a particular person that have been completed. There are several possibilities for status reports that can be generated according to embodiments described herein.

Relationship rules between various message types drive various metrics within the stream, such as generated reports indicating which messages (i.e. questions, issues, etc) have been resolved (i.e. answered, resolution, etc). It also allows stream members to filter by closing message type and to determine a status of items within the stream. Filtering enables a user to focus on what is relevant and important at the moment, i.e. filter out noise or find items of interest. For example, if the stream is a project within an enterprise and various issue messages and question messages have been generated by stream members, the stream owner can quickly determine which issues have been resolved and which questions have been answered, while also determining which issues are outstanding and which questions still require answers.

FIG. 9 illustrates a screen shot 900 for managing template category fields. The screen shot 900 lists items for current category data fields that are part of a message entry form for a stream. Fields can turn messages into meaningful information. The category data is used for collecting categorization and other data that enhances message context and searchability. In one embodiment, a user can specify where he/she wants the fields located within the designated area on the message entry form by changing the row, column, and column span values for each field. Therefore, the system provides an easy way for a stream owner to customize the message entry form and determine how data is organized therein.

Figure 10:
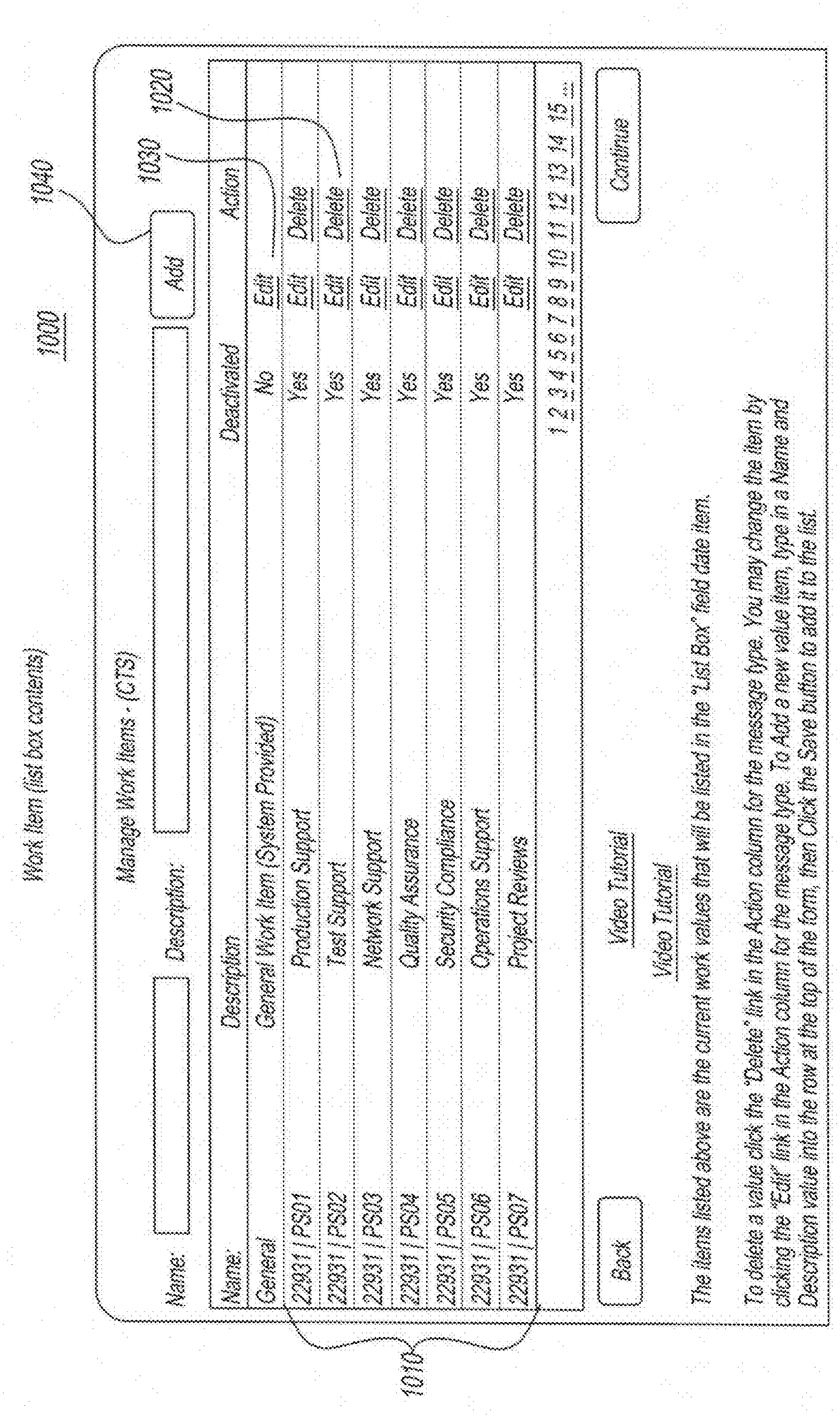
FIG. 10 is a screen shot of managing work items, according to an embodiment.

FIG. 10 illustrates a screen shot 1000 for managing work items. A "work item" is an example of a list box category that was filed for a particular stream template. A category field can be called any name of relevance to the particular stream activity that describes the items in the list. The items listed 1010 are the current work item values that would be listed in the "list box" field data item. Work items can be deleted 1020 or edited 1030, or a new value item can be added 1040. Another example of a category field is "activity." The "activity" category field would list individual activity items within that field. Other examples of category fields include, but are not limited to "start time," "end time," "due date," and "state." A category field can also be specific names, such as a listing of all committees in which the user is a participating member. Accordingly, this allows a user to populate category fields that are selection lists and to maintain elements in the list.

Figure 11A:
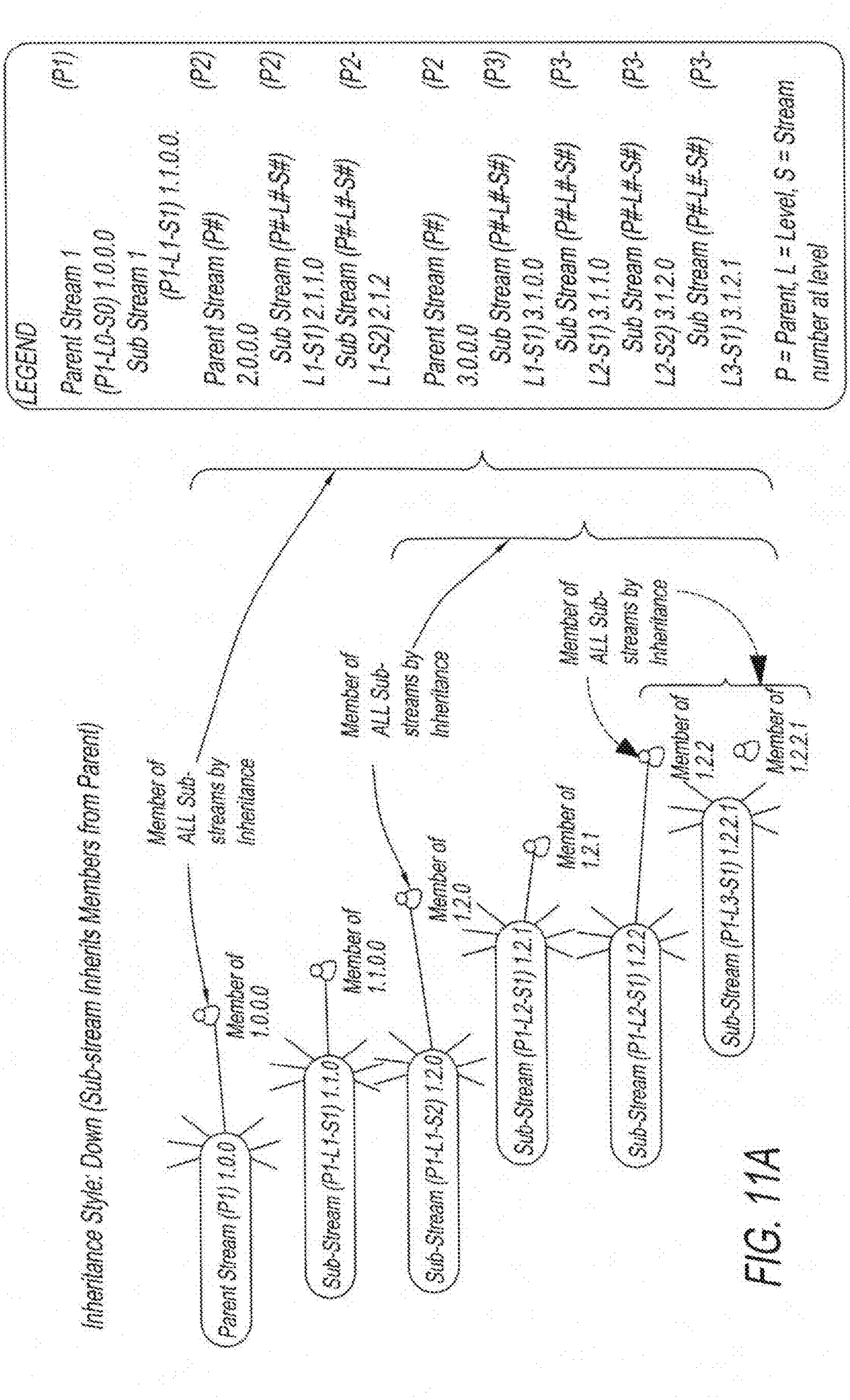
FIGS. 11A-11B illustrate a sub-stream hierarchy, according to an embodiment.
Figure 11B:
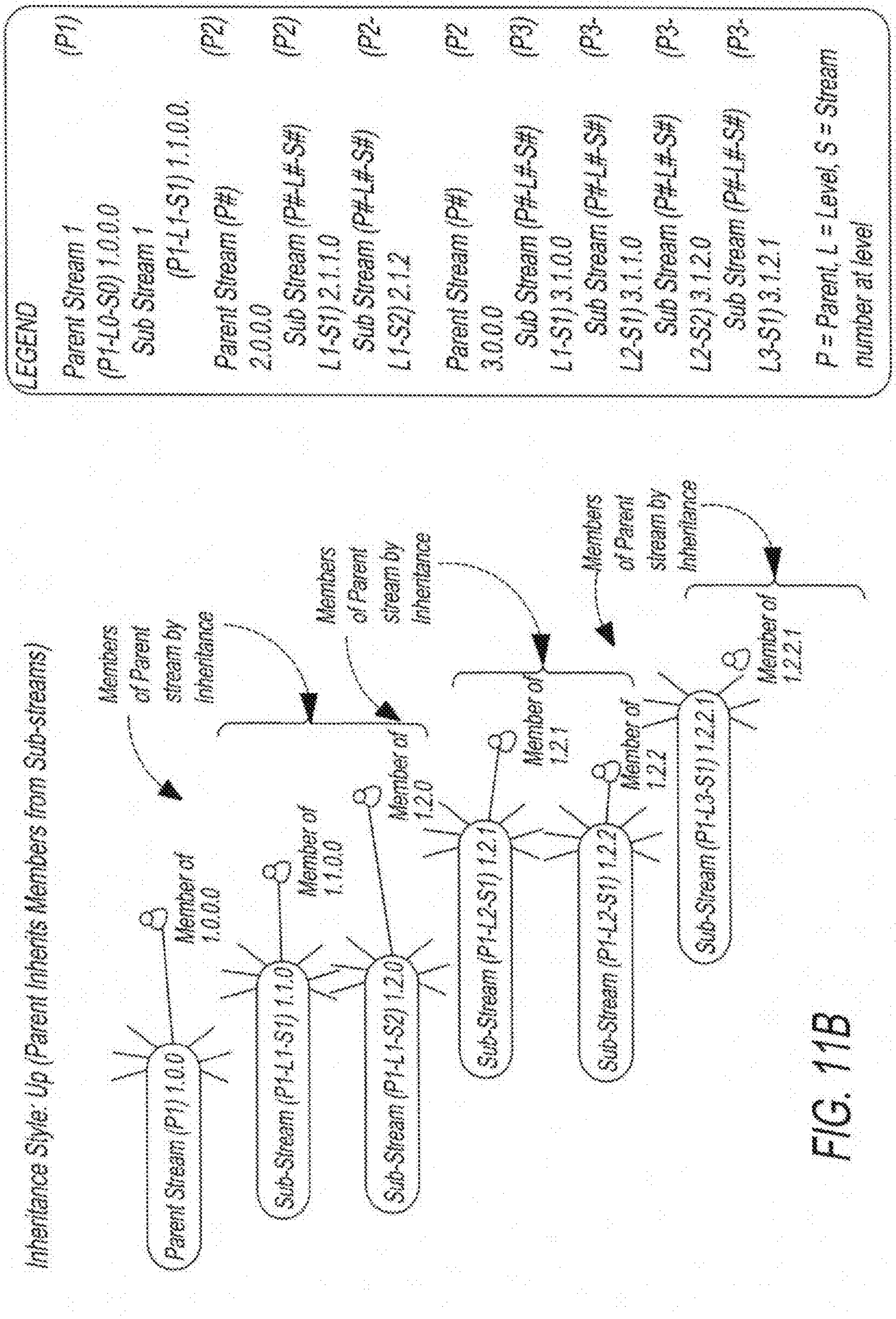

FIG. 11 illustrates the hierarchy in which streams and sub-streams can be structured. FIG. 11 illustrates that a parent member is a member of all sub-streams by inheritance. For example, the upper portion of FIG. 11 illustrates that 1.0.0 is a member of all sub-streams 1.1.0, 1.2.0, 1.2.1, 1.2.2, and 1.2.2.1. It also illustrates that 1.2.0 is a member by inheritance of the sub-streams 1.2.1, 1.2.2, and 1.2.2.1. Likewise, 1.2.2 is a member by inheritance of the sub-stream 1.2.2.1. The lower portion of FIG. 11 illustrates how the sub-streams are ultimately inherited by the parent stream 1.0.0.

Figure 12B:
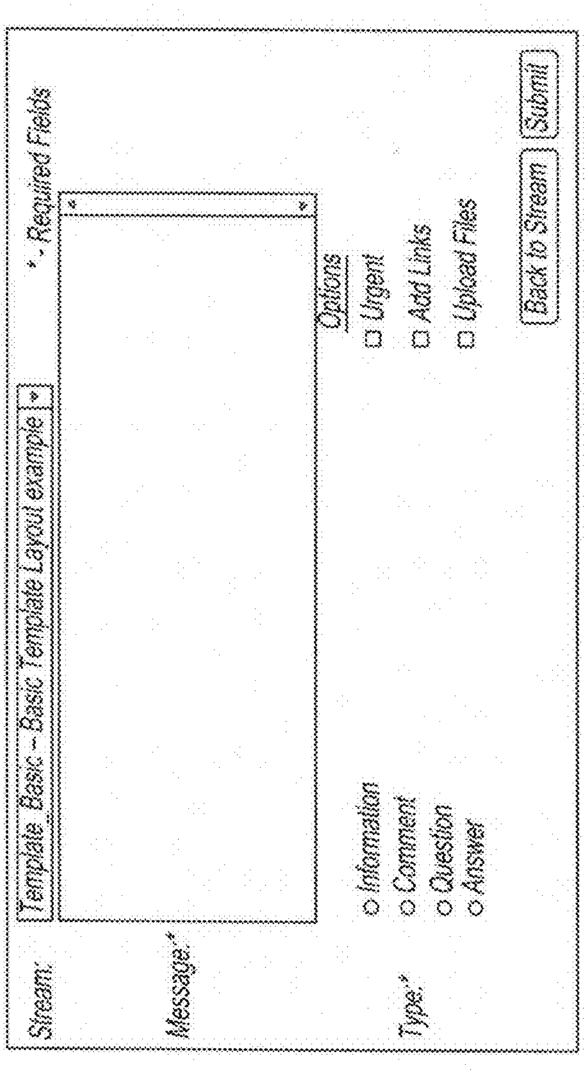

Embodiments will be described for a wizard by which stream configuration templates can be formed, with reference to FIGS. 12A-12G. FIG. 12A illustrates a screen shot for a new template setup. A selection can be made for a particular type of template, such as a basic setup, which has no category data fields. A second type of setup is an extended setup, which has all category data fields. However, some of the category data fields can be edited or deleted. A third type of setup is a custom setup, in which the number and type of category data fields can be selected. A fourth type of setup is an existing custom template. However, other categories of template setups can be established and are contemplated by embodiments described herein. After selecting a type of template for setup, a value for the name of the template and a description for the template can be entered.

Figure 12C:
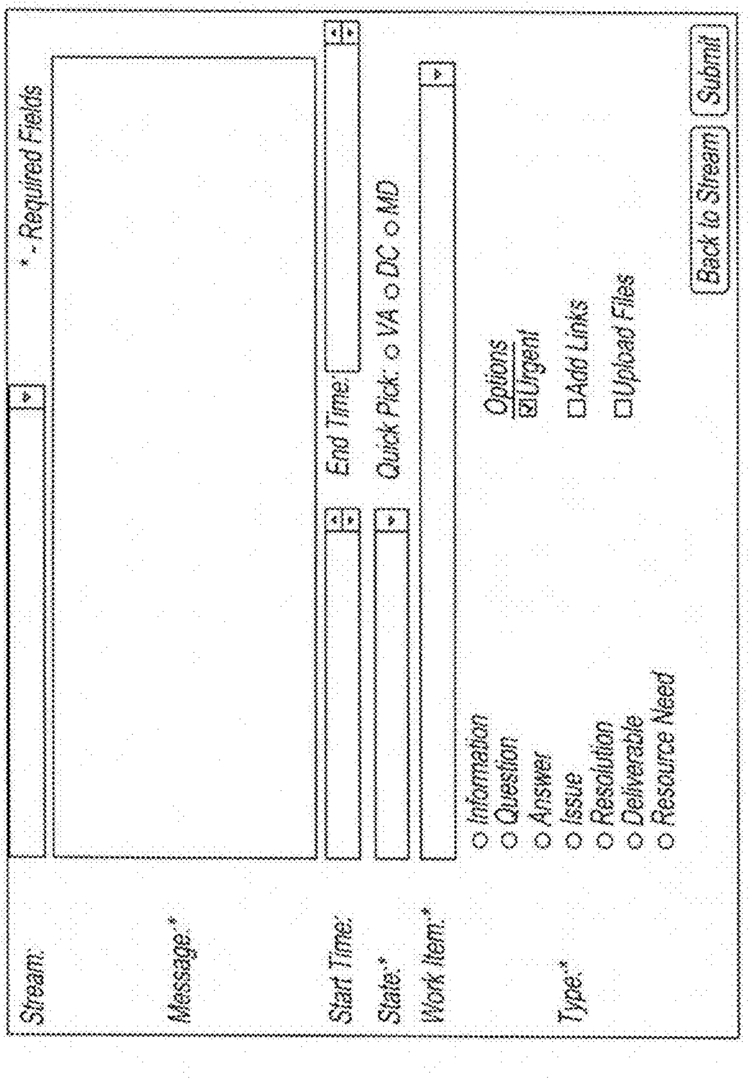
Figure 12E:
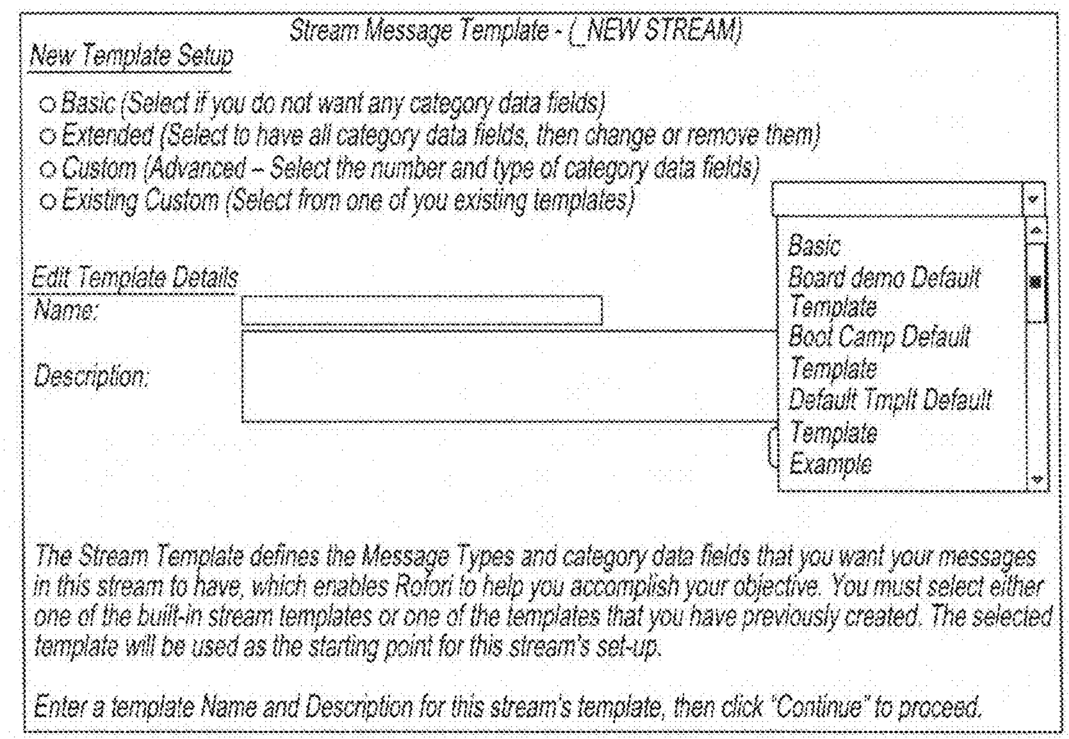
Figure 12G:
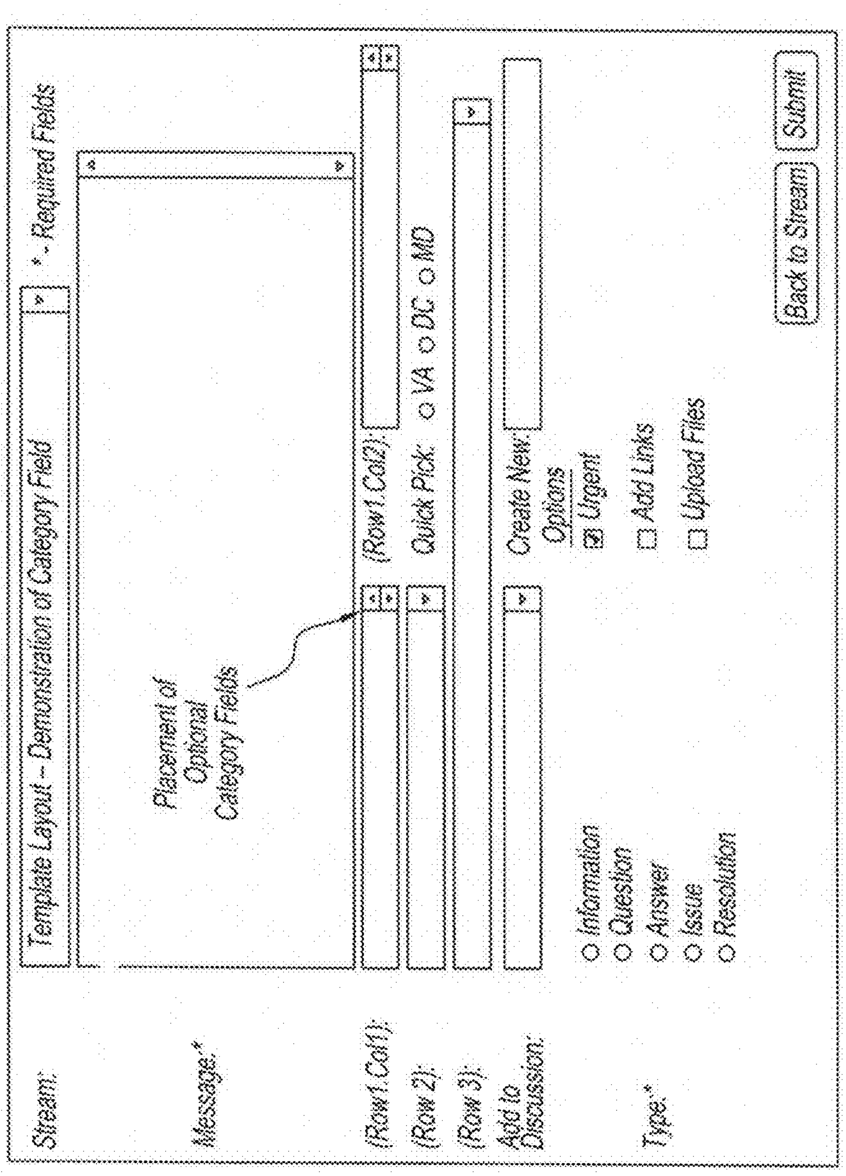

FIG. 12B is a screen shot illustrating a basic template selection. The basic template can be configured with no additional category fields defined and a minimal set of message types. FIG. 12C is a screen shot illustrating an extended template selection, which can have all possible category fields. A custom template, illustrated in the screen shot of FIG. 12D, allows a user to select which fields to be included in the template from those available and the number of each field. FIG. 12E is a screen shot illustrating a selection of an existing template. FIG. 12F is a screen shot illustrating enablement of discussion categories, previewing message input form from previous changes, and adding more category fields. FIG. 12G is a screen shot illustrating the placement of category fields, which can be used to relate messages to other aspects of the stream's activity, such as project management, timesheet, or other tracking system identification codes or activity categories, due dates, or occurrence dates. FIGS. 12A-12G illustrate a basic template set-up. However, a vast array of templates can be established to assist a user in setting up a stream to fit his/her needs, including but not limited to templates for project management, consulting, product beta testing, board of directors, individualized education programs, pharmaceutical, publishing, advocacy group, student project, telework, and application consulting support.

A template wizard can display the forms needed to define a particular stream message input form. After starting the wizard, a stream properties option can be selected in a stream summary pane, or by clicking a view link in a manage streams administration menu. Other embodiments can include a manage-items-forms option or a video tutorial. For any template selected, message types should include types that best define the particular stream and identify the important status events or milestones in managing the forward progress towards accomplishment of the stream objectives. The message types provide an immediate visual identification of what is happening, enables easy status reporting, and is the basis for creating knowledge. The manage message types of the template wizard is used to add, change, and delete the stream's message types.

Figure 13:
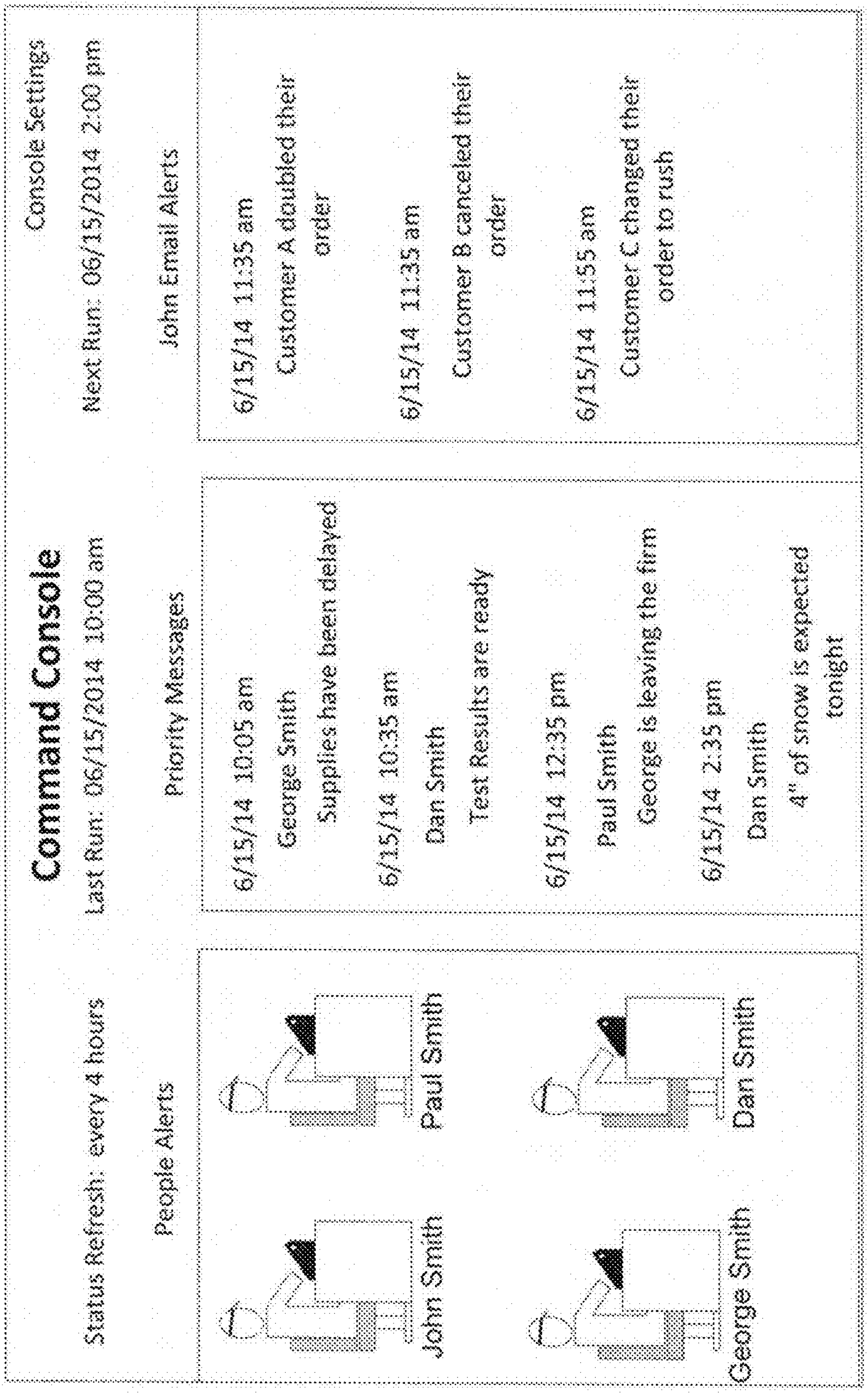
FIG. 13 is a screenshot of a console, according to an embodiment.

FIG. 13 shows a screen shot illustrating a console that can be defined by a user. A console illustrates an activity summary and the run periods for the last run and the next run. Console settings are available for each console. FIG. 13 illustrates the stream member names and associated pictures, priority messages as defined, and alert messages from a particular member. Another example of a console could illustrate all members of the stream, messages sorted by message type, and key members of the stream. Another example of a console could illustrate issues and deliverables for the stream, along with stream members and activity of the stream illustrated by a graph. Many other options and combinations of options for a console are contemplated by embodiments described herein.

FIG. 14 illustrates a status report according to embodiments described herein. The status can be automatically categorized according to selected categories by a stream owner and/or stream member. Based on original messages that were tagged with a message type, such as issues (resolved), issues (not resolved), questions (answered), and questions (not answered), the system can instantly generate a status report having results under those particular categories. For example, the system can generate a report indicating each message and the status with respect to that message and/or can generate reports based on message types having a complementary message type. Based on the algorithms described herein, the system can traverse the messages to determine which messages have been flagged as having a complementary message in response to an original posting. Thus, each message having an issue as the message type can be listed along with corresponding messages having a resolution message type paired with this message. The system can include any content included with those messages as well as the final disposition, such that a reviewer can easily grasp the status of particular items within the stream. Further, stream members can be identified that were involved in posting original messages, as well as follow up messages that resolved a complementary message type (question/answer) so that the reviewer can also know who was involved in completing various assignments or answering questions, for example.

In addition, automatic metrics can be generated, such as the metrics in the table at the bottom of FIG. 14. The system can generate a chart having one or more of the following: the number of messages having various message types (i.e. question, issue), the number of responses to each message, the people who responded to the messages, the amount of closed messages (i.e. questions answers, issues resolved), the number of messages to which no responses were provided, and the average amount of time to respond or not respond. This information can be determined by the system based on the information included with each message, such as date and time information, message type information, message link information, and flag information for complementary message types that have been analyzed by the system and determined to have a correlation.

Embodiments described herein also provide a mechanism for stream members to rate the quality of answers, resolutions, deliverables, and/or completions that could factor into a user's contribution score. Gamification is a mechanism in which to drive engagement and team performance. Based upon generated metrics, a recognition or award program can be established for a defined performance interval, such as quarterly, monthly, weekly, etc. Examples of rated member actions include, but are not limited to the fastest member to respond to another member's question or issue marked as urgent, the fastest member to respond to another member's question or issue not marked as urgent, the member having the highest contribution value in each stream, and the member having the highest contribution overall across all streams. A contribution value can be computed by totaling a member's score, where an example point system might include two points for answering a question, six points for resolving an issue, five points for completing a task, one point for asking a question, two points for identifying an issue, two bonus points for providing an answer or resolution within thirty minutes, and one bonus point for completing a task before its due date. However, several other metric combinations are contemplated by embodiments described herein. All values and thresholds are preferences, so that the stream owner may adjust the importance of items in the individual stream and accommodate additional message types and relationships.

The status reports provide numerous advantages for a project manager or anyone that is coordinating or managing the accomplishment of the stream's activity. Status reports can replace most or all of status meetings. Project managers can easily create one or more streams for various projects and can include only stream members who are assigned to those particular projects. Based on message posting by the stream members, the project manager can have the system generate a status report detailing the status of various assignments, tasks, or question metrics within the stream. Therefore, the project manager can easily identify which items have been resolved and which items remain outstanding, as well as which members of the team have been productive and which have been inefficient or ineffective.

Figure 15:
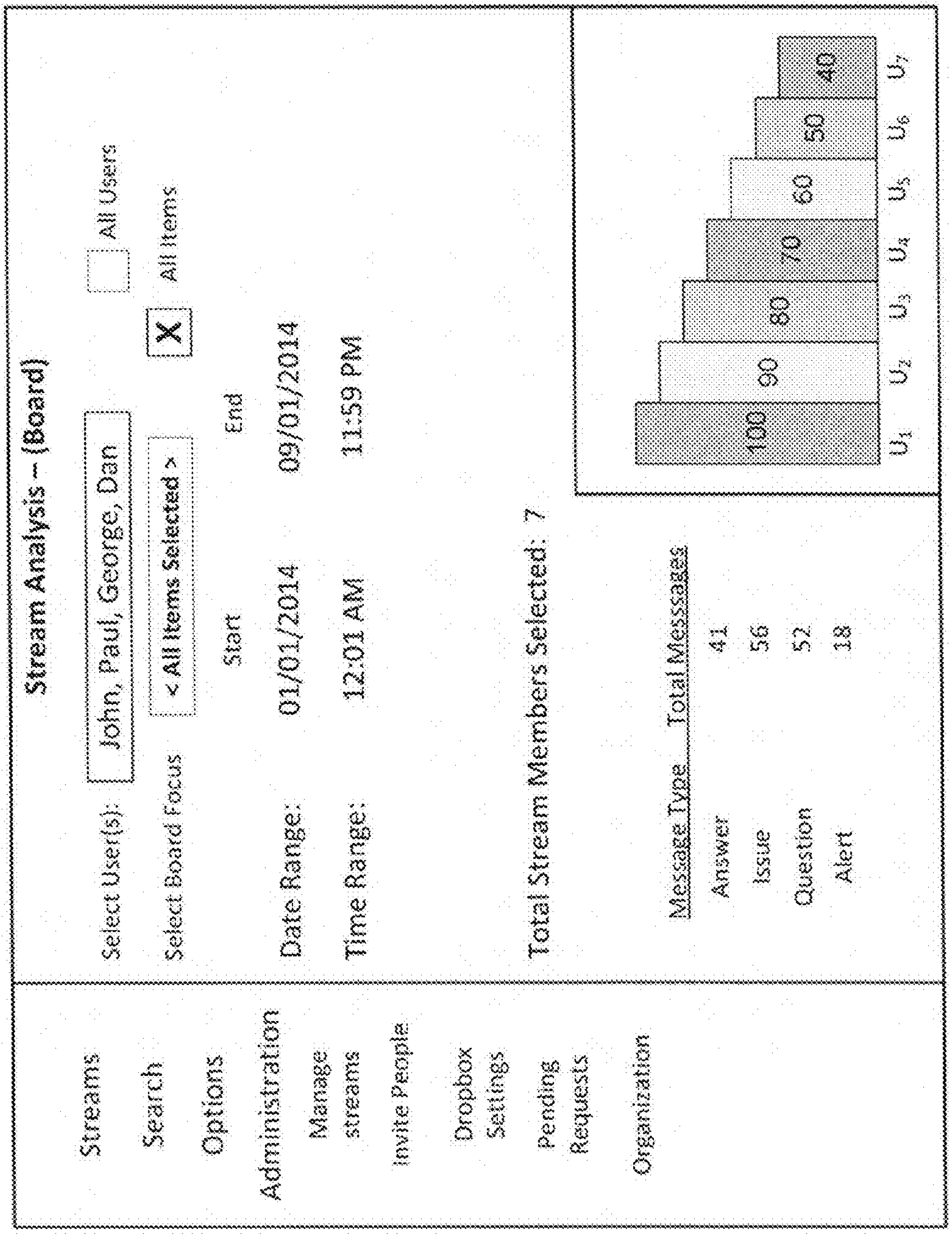
FIG. 15 is a screen shot of a stream analysis, according to an embodiment.

FIG. 15 illustrates a stream analysis report. In the particular illustrated example, the message types of answer, issue, question, and alert can be graphically illustrated for each stream member. Accordingly, the system can generate a report indicating how many of each particular message types have been generated by various members of the stream. The number of each message by message type can also be generated and displayed. This information can be determined based on a window of time, thereby allowing project managers to quickly identify who is answering a lot of questions, who is resolving a lot of issues, and who may be asking a lot of questions. As noted above, this represents a powerful tool that project managers and/or stream owners, for example, can use to determine the status of projects and identify team members that are working effectively, as well as those that may need improvement. A stream analysis report can also be used to indicate who is working (i.e. there are messages posted frequently into one or more streams) and who is productive for user defined intervals (i.e. the persons contributing relevant and important content).

Embodiments described herein can also be used to extract time entry information and to generate time sheets. In an embodiment, a task start and task end times indicated in message entries can be used for automatic posting into a timesheet system. The system can also estimate starting and ending times based upon the message post time stamp. In one embodiment, a user may post a message into Stream A, and at some later time, post a message at a specific time in Stream B. The system can assume that the message in Stream A is the end of the activity for Customer A and start accumulating time towards Customer B of Stream B, since that is the next message posted by the user. An infrastructure embodiment may include a web service-based architecture accessible through the Internet. A browser-based web application user interface can be used. Message contents that can be used to generate the timesheet include but are not limited to a user ID, a client ID, a date and time stamp, a state indicator, a work item code pertaining to the message, a message type code, a public or private flag, and a message text. Timesheet data can be filtered by one client ID, multiple client IDs, or all client IDs.

Timesheet data is based on tagged message feeds from one or more streams, in which a stream is a sequence of micro-blogged entries by members, i.e. a work diary. Embodiments for entries, such as a task or an assignment can include a time clock, either manually initiated or automatically initiated. The time clock could stay open until the specific task or assignment is completed or until a different task or assignment is initiated. In addition, the new task or assignment can initiate a new time clock. A further embodiment could include a restriction from having more than one time clock simultaneously active.

Figure 16A:
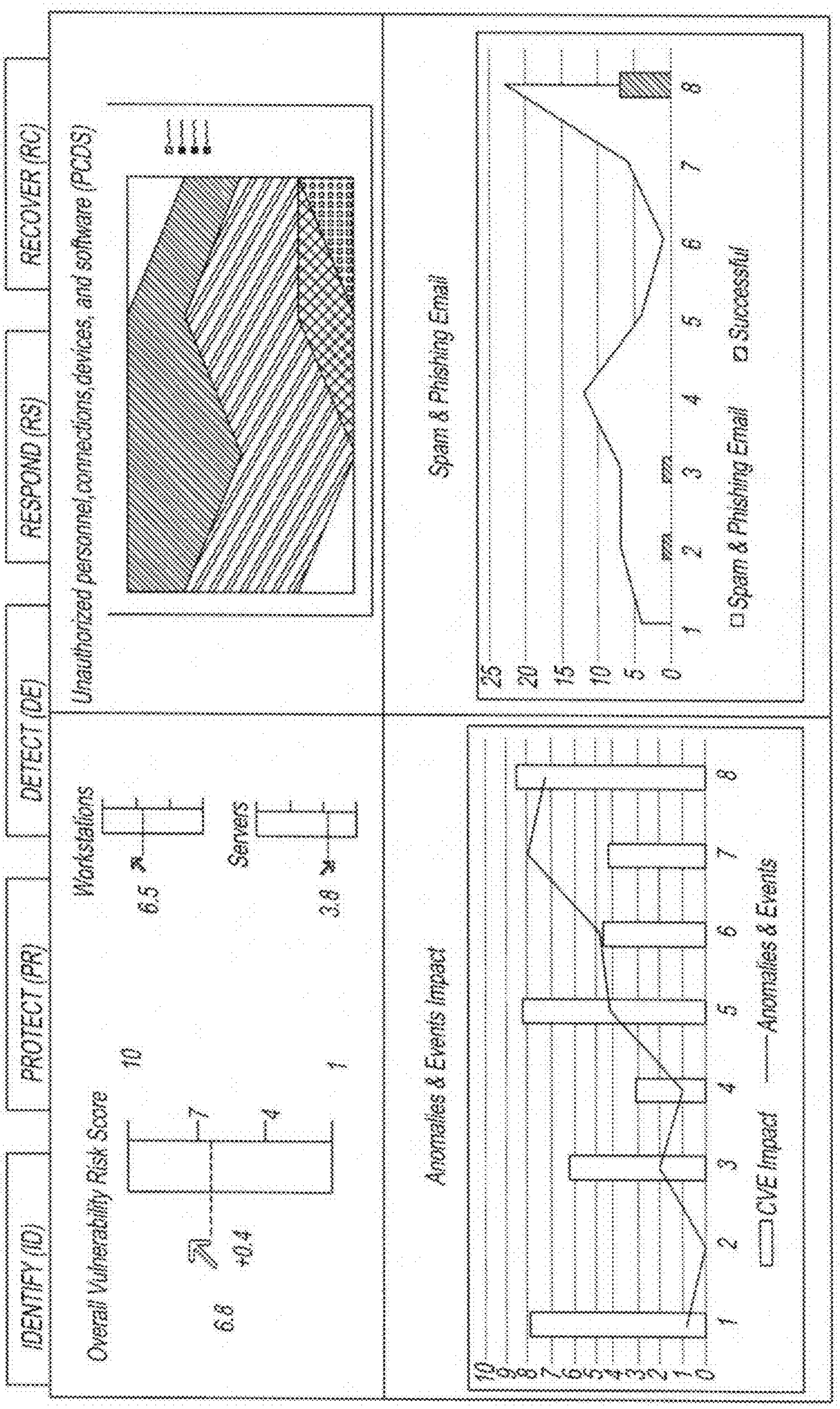
FIG. 16A illustrates a cybersecurity dashboard, according to an embodiment.
Figure 16B:
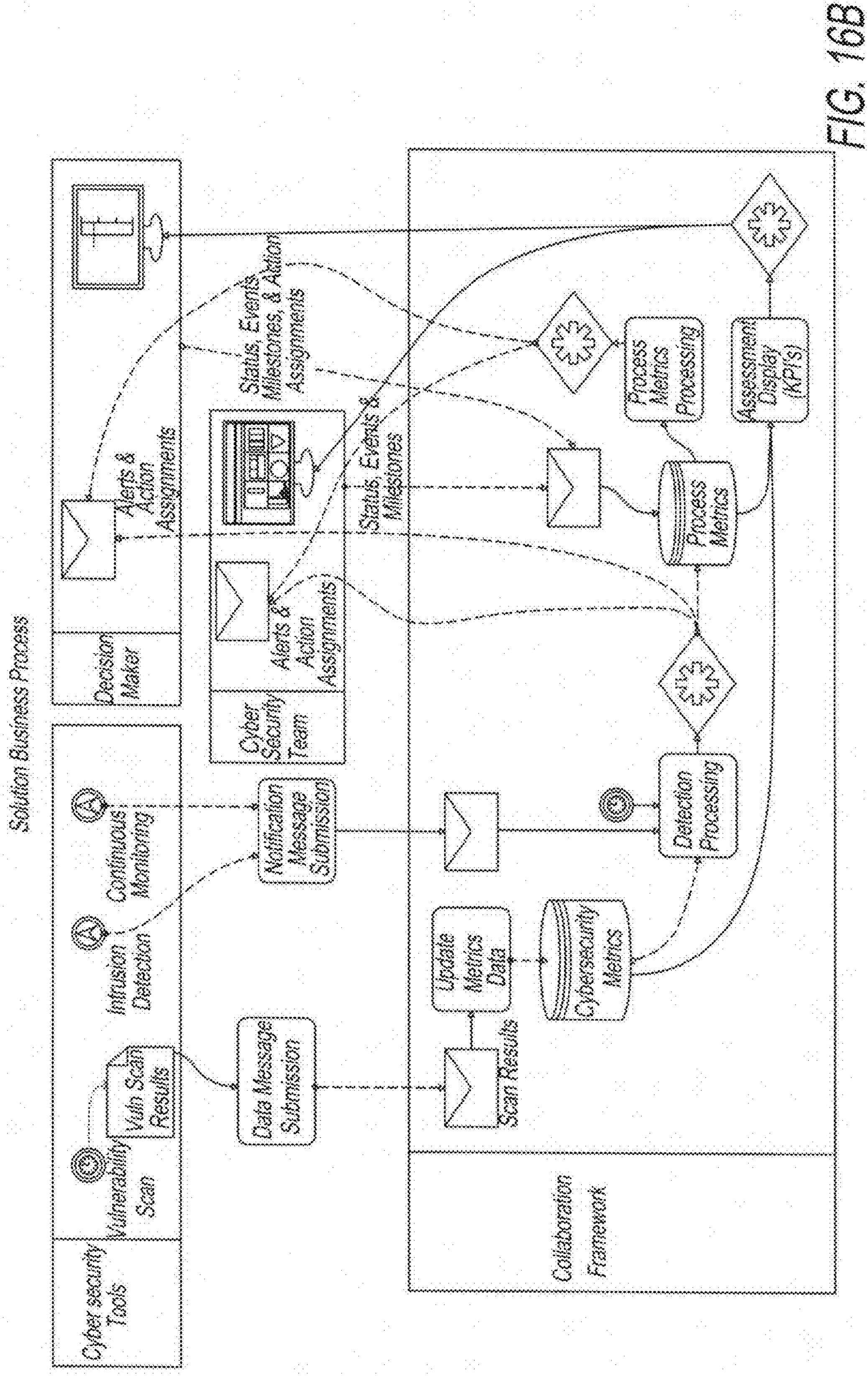
FIG. 16B illustrates a business process overview, according to an embodiment.

Embodiments described herein also provide dashboards that can be designed according to an area of interest for each user of a stream. FIG. 16A illustrates a cybersecurity dashboard, which includes multiple windows of graphed ongoing results, from which much of the process metrics data is derived from the embodiments described herein. When continuous monitoring and other cybersecurity focused systems feed categorized messages into the system, in combination with team member user categorized activity messages, the multiple windows can monitor various aspects of interest, such as a posture assessment, overall vulnerability risk score, unauthorized personnel, connections, devices, and software, anomalies and events impact, and spam and phishing email. FIG. 16A illustrates just one example dashboard of one area of interest, i.e. cybersecurity. However, a user could design a multiple-window dashboard for any particular area of interest, from a military operation to a child day care facility. A dashboard provides instant visual information on the activities of a stream. FIG. 16B illustrates a process flow using embodiments described herein to integrate human and machine activity/situation status, events, milestones, alerts, and notifications as might be used with the cybersecurity dashboard illustrated in FIG. 16A. Insight and process metrics for a work group environment is realized, turning unstructured processes into collaborative processes.

Figure 17:
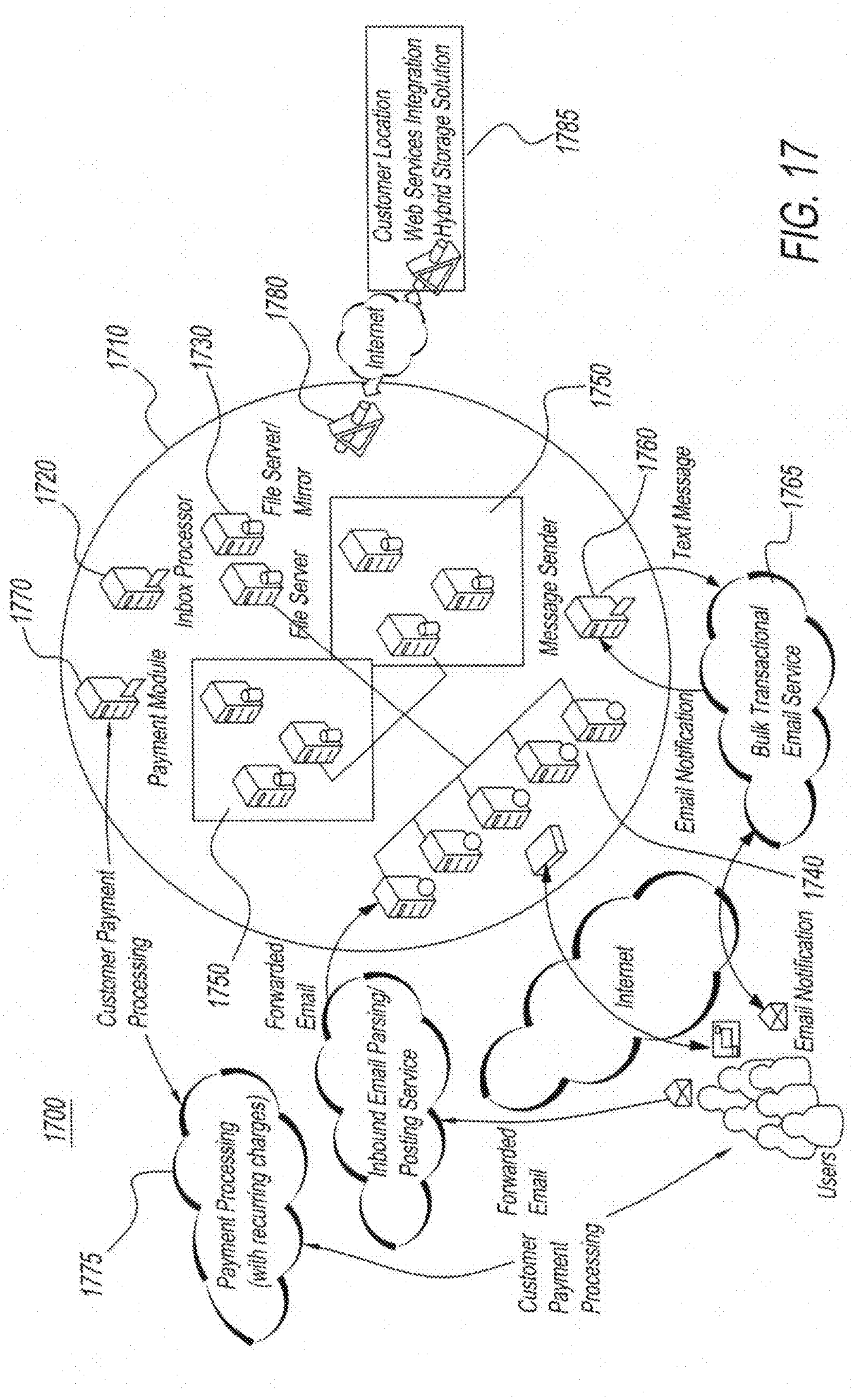
FIG. 17 illustrates a hardware infrastructure, according to an embodiment.

Embodiments described herein provide a connection between a front end of collaboration technology and a backend infrastructure to provide stream-related documents, relevant content reporting, and extended integration. FIG. 17 illustrates a hardware network 1700 as used with embodiments described herein. The central hardware hub 1710 includes several servers and processors. The hub includes but is not limited to an inbox processor 1720 and one or more file servers 1730 that are connected to multiple load balanced web farm servers 1740. The central hardware hub 1710 also includes multiple groups of primary with backup SQL servers 1750, a message sender 1760 connected to a bulk transactional email service, a payment module 1770 connected to a payment processing center 1775, and a hybrid storage module 1780 connected to a customer location web services integration center 1785, via the Internet. The number and layout of servers and processors in FIG. 17 are given for illustrative purposes only, and the actual number and layout of servers and processors could vary there from.

It should be noted that while the descriptions provided above with respect to the graphical user interfaces of the system described herein illustrate various icons, naming conventions, and executable interfaces at various locations within the graphical user interface, the system described herein is not limited to such implementations. For example, the icons, descriptions, naming conventions, and the like can be displayed in a variety of areas and in a variety of configurations that may either be predetermined or established by the stream owner.

Figure 18:
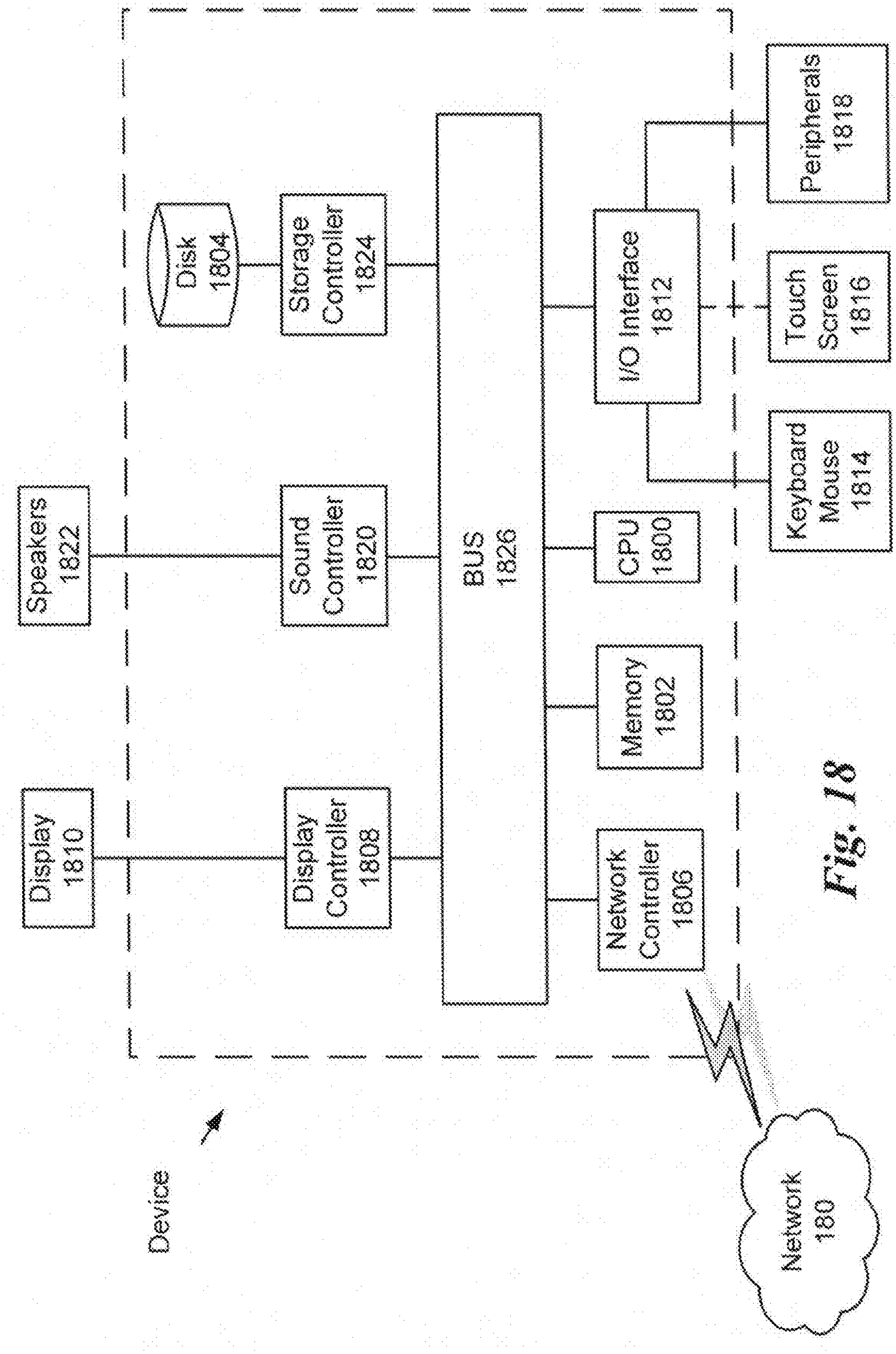
FIG. 18 illustrates a hardware view of a server and/or computer, according to an embodiment.

A hardware description of a computer or server for implementing the system according to exemplary embodiments is described with reference to FIG. 18. In FIG. 18, the server includes a CPU 1800 which performs the processes described above. The process data and instructions may be stored in memory 1802. These processes and instructions may also be stored on a storage medium disk 1804 such as a hard drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor and/or server communicates, such as a server or computer.

Further, the described embodiments may be provided as a utility application, background daemon, or component of an operating system, or combination thereof, executing in conjunction with CPU 1800 and an operating system such as Microsoft Windows 7, UNIX, Solaris, LINUX, Apple MAC-OS and other systems known to those skilled in the art.

CPU 1800 may be a Xenon or Core processor from Intel of America or an Opteron processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

The server in FIG. 18 also includes a network controller 1806, such as an Intel Ethernet PRO network interface card from Intel Corporation of America, for interfacing with network 180. As can be appreciated, the network 180 can be a public network, such as the Internet, or a private network such as an LAN or WAN network, or any combination thereof and can also include PSTN or ISDN sub-networks. The network 180 can also be wired, such as an Ethernet network, or can be wireless such as a cellular network including EDGE, 3G and 4G wireless cellular systems. The wireless network can also be WiFi, Bluetooth, or any other wireless form of communication that is known.

The server further includes a display controller 1808, such as a NVIDIA GeForce GTX or Quadro graphics adaptor from NVIDIA Corporation of America for interfacing with display 1810, such as a Hewlett Packard HPL2445w LCD monitor. A general purpose I/O interface 1812 interfaces with a keyboard and/or mouse 1814 as well as a touch screen panel 1816 on or separate from display 1810. General purpose I/O interface 1812 also connects to a variety of peripherals 1818 including printers and scanners, such as an OfficeJet or DeskJet from Hewlett Packard.

A sound controller 1820 is also provided in the processor and/or server, such as Sound Blaster X-Fi Titanium from Creative, to interface with speakers/microphone 1822 thereby providing sounds and/or music.

The general purpose storage controller 1824 connects the storage medium disk 1804 with communication bus 1826, which may be an ISA, EISA, VESA, PCI, or similar, for interconnecting all of the components of the processor and/or server. A description of the general features and functionality of the display 1810, keyboard and/or mouse 1814, as well as the display controller 1808, storage controller 1824, network controller 1806, sound controller 1820, and general purpose I/O interface 1812 is omitted herein for brevity as these features are known. One or more of the servers illustrated in FIG. 17 may not have every feature illustrated in FIG. 18, and other servers illustrated in FIG. 17 may have additional features not illustrated in FIG. 18.

Figure 19:
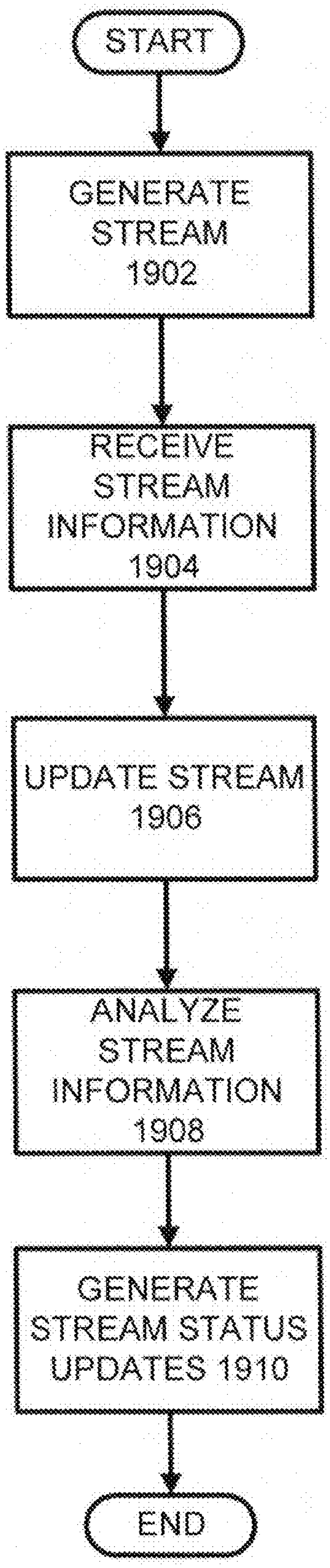
FIG. 19 illustrates a flow chart describing the generation and processing of stream information, according to an embodiment.

FIG. 19 illustrates a flow chart describing processes for generating and updating stream information according to one example. As illustrated in FIG. 19, the process starts at step S1902 at which point a stream is generated. The system, implemented for example via the server described with respect to FIG. 18, receives a command from a user/stream owner logged into the system to generate a new stream. At this point, the system generates a stream having identification information provided by the stream owner. Upon generating the stream, the stream owner can request a predetermined stream setup provided by the system having a predetermined format or the stream owner can create their own stream format as described previously herein. The stream member can then invite other people or entities to join the stream. This can be done via email, text or any other method as would be understood by one of ordinary skill in the art.

Once a stream has been generated at step S1902, processing proceeds to step S1904 at which point the stream of the system is able to receive stream information. Stream information can consist of a variety of information such as new members accepting an invite, calendar updates, receipt of stream messages and the like. This information can be received by stream members who are logged into the system or can be received from sensors or other external communications sources. For example, the system may traverse a network to automatically bring in desired information or an Application Programming Interface (API) can be utilized for outside vendors to introduce information into the stream.

Once any type of information is received by the system with respect to a stream that has been generated at step S1902, processing proceeds to step S1906 at which point the system updates the stream. This can include a variety of processes such as updating the stream to include new messages, tasks and/or video meetings introduced to the stream by stream members or external sources in the previous step. The updating of the stream may also include updates made by the stream owner such as the inclusion of new message types, categories, input formats and the like as previously described herein. This process is repeated periodically at predetermined times or can be instantiated any time an update is provided to an existing stream. Further, the updating of the stream at step S1906 includes storing any new information received and updating any data structures such as additional information related to stream messages.

Once the stream has been updated with any received information, processing proceeds to step S1908 at which point the system analyzes all of the newly received stream information. Analysis is performed by the system, for example, to update any correlations between the information that has been received at step S1904 and updated at step S1906. For example, a new message received from a stream member may be analyzed to determine the message type and whether the message is correlated with any other messages as previously describe herein. This could include forming a correlation between messages based on their relation to each other, based on a response, and/or based on message types have complimentary message types and satisfying the complimentary message rules as described previously herein. Any information derived from the stream analysis, such as correlations between messages, is updated and stored by the system. For example, the data structure of certain messages as illustrated in FIG. 4B may be updated to include additional internal links 490 and type complement information 492.

Once information has been updated in the stream and analyzed by the system, processing proceeds to allow for the generation of stream status updates at step S1910. Accordingly, a stream member may request that the system generate metrics, such as those described with respect to FIG. 14, based on the latest updates and analysis performed by the system. Accordingly, a stream member may request how many messages exist in the stream which have a "question" message type as well as which of these messages have correlated messages having an "answer" message type thereby satisfying complimentary message rules as described previously herein. The stream member could then easily discern the status of various inquires in the stream. If there are a variety of work categories then the user could further request that the system generate metrics related to question and answer message types with respect to a particular work item. As described previously herein, a stream member could also request metrics with respect to turn-around-time for particular stream members to determine who effectively answered questions and how quickly.

Thus, the system embodiments described herein provide for a communication collaboration tool that provides an impetus for users to communicate relevant information while also allowing for users to easily filter and quantify relevant information with little to no noise that occurs typically in other communication systems. Further advantages are prevalent from the descriptions and illustrations provided herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define in part, the scope of the foregoing claim terminology such that no inventive subject matter is dedicated to the public.

The invention claimed is:

1. A computer-implemented method comprising:

generating, at one or more servers, a communication stream having one or more stream members;

receiving, at the one or more servers, a plurality of stream messages from the one or more stream members, the plurality of stream messages each including a message content and a message type;

adding, at the one or more servers, the stream messages to the communication stream to be accessible by the one or more stream members;

analyzing, at the one or more servers, the message type of each of the stream messages and forming correlations there-between, the correlations being a function of complementary message rules; and serving, from the one or more servers to a client device, communication stream status updates to the client device, the communication stream status updates being based in part on message types of the plurality of stream messages and an analysis of correlations formed between the plurality of stream messages.

2. The computer-implemented method of claim 1, wherein the message type indicates status events relating to an objective of the communication stream.

3. The computer-implemented method of claim 1, wherein the message type includes at least one of status, feedback, question, answer, issue, and resolution.

4. The computer-implemented method of claim 1, wherein an amount of available message types cannot exceed a predetermined value.

5. The computer-implemented method of claim 1, further comprising:

analyzing, at the one or more servers and in response to receiving a response message to a stream message, the message type of the stream message and the message type of the response message to form a correlation there-between, the correlation being a function of the complementary message rules.

6. The computer-implemented method of claim 1, further comprising:

filtering, at the one or more servers, the messages based on the message types.

7. The computer-implemented method of claim 1, further comprising:

filtering, at the one or more servers, the stream messages based on the message types and correlations formed between the stream messages.

8. The computer-implemented method of claim 1, wherein the communication stream further includes category indicators identifying various aspects of activities relating to an objective of the communication stream.

9. The computer-implemented method of claim 7, wherein each of the stream messages further includes a category indicator.

10. The computer-implemented method of claim 7, further comprising:

filtering, at the one or more servers, the stream messages based on the category indicator and the message type.

11. The computer-implemented method of claim 1, wherein the communication stream status updates include metrics relating to stream messages having correlations satisfying the complementary message rules.

12. The computer-implemented method of claim 1, further comprising:

serving, from the one or more servers to the client device, a user interface having a first section containing a plurality of stream messages each containing a visual indicator corresponding to the message type of the particular stream message, and a second section containing details of a select stream message.

13. A computer-implemented method for providing a communication stream on a client device, the method comprising:

transmitting, from the client device to at least one server, a command for the at least one server to generate a communication stream having one or more stream members, a user of the client device being one member of the communication stream;

transmitting, from the client device to the at least one server, a plurality of stream messages, the plurality of stream messages each including a message content and a message type;

receiving, at the client device from the at least one server, the communication stream accessible by the one or more stream members and having the stream messages, the communication stream further having correlations formed between the message types of the stream messages, the correlations being a function of complementary message rules; and receiving, at the client device and from the at least one server, communication stream status updates, the communication stream status updates being based in part on message types of the stream messages and an analysis of correlations formed between the stream messages.

14. The computer-implemented method of claim 13, wherein the message type indicates status events relating to an objective of the communication stream.

15. The computer-implemented method of claim 13, wherein an amount of available message types cannot exceed a predetermined value.

16. The computer-implemented method of claim 13, further comprising:

receiving, at the client device and from the at least one server, messages filtered based on the message types and correlations formed between the stream messages.

17. The computer-implemented method of claim 13, wherein the communication stream further includes category indicators identifying various aspects of activities relating to an objective of the communication stream.

18. The computer-implemented method of claim 17, wherein each stream message further includes a category indicator.

19. The computer-implemented method of claim 17, further comprising:

receiving, at the client device from the at least one server, messages filtered based on the category indicator and the message type.

20. The computer-implemented method of claim 13, wherein the communication stream status updates include metrics relating to stream messages having correlations satisfying the complementary message rules.

* * * * *